(12) United States Patent
Hanekamp, Jr. et al.

(10) Patent No.: US 10,872,384 B1
(45) Date of Patent: Dec. 22, 2020

(54) SYSTEM AND METHOD FOR GENERATING EXPLANATIONS FOR YEAR-OVER-YEAR TAX CHANGES

(71) Applicant: Intuit Inc., Mountain View, CA (US)

(72) Inventors: David A. Hanekamp, Jr., Carlsbad, CA (US); Gang Wang, San Diego, CA (US); Kevin M. McCluskey, Carlsbad, CA (US); Michael A. Artamonov, San Diego, CA (US); Daniel P. Dunbar, Encinitas, CA (US); Luis F. Cabrera, Bellevue, WA (US); Per-Kristian Halvorsen, Los Altos Hills, CA (US)

(73) Assignee: Intuit Inc., Mountain View, CA (US)

( * ) Notice: Subject to any disclaimer, the term of this patent is extended or adjusted under 35 U.S.C. 154(b) by 495 days.

(21) Appl. No.: 14/673,261

(22) Filed: Mar. 30, 2015

(51) Int. Cl.
*G06Q 40/00* (2012.01)

(52) U.S. Cl.
CPC .................................. *G06Q 40/123* (2013.12)

(58) Field of Classification Search
None
See application file for complete search history.

(56) References Cited

U.S. PATENT DOCUMENTS

| | | |
|---|---|---|
| 4,213,251 A | 7/1980 | Foundos |
| 4,809,219 A | 2/1989 | Ashford et al. |
| 5,006,998 A | 4/1991 | Yasunobu |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Wikipedia, https://en.wikipedia.org/wiki/Data_structure, "Data Structures", Jan. 12, 2012, entire page (Year: 2012).*

(Continued)

*Primary Examiner* — Christopher Bridges
(74) *Attorney, Agent, or Firm* — DLA Piper LLP (US)

(57) ABSTRACT

A computer-implemented method for generating an explanation for changes in tax liability over different tax reporting periods includes a computing device executing a tax calculation engine associated with tax preparation software. The tax calculation engine operates on first and second tax calculation graphs representing different tax reporting periods. The first and second tax calculation graphs are different in at least one respect. The first and second tax calculation graphs each describe data dependent tax operations comprising a plurality of interconnecting functional nodes connected by one of a plurality of functions. The computing device automatically identifies the differences among nodes within the respective first and second tax calculation graphs and executes an explanation engine associated with the tax preparation software to generate a textual explanation identifying one or more differences among the nodes.

28 Claims, 19 Drawing Sheets

(56) References Cited

U.S. PATENT DOCUMENTS

| | | | |
|---|---|---|---|
| 6,535,883 B1 | 3/2003 | Lee et al. | |
| 6,601,055 B1 * | 7/2003 | Roberts | G06K 9/6293 |
| | | | 706/45 |
| 6,631,361 B1 | 10/2003 | O'Flaherty et al. | |
| 6,670,969 B1 | 12/2003 | Halstead et al. | |
| 6,690,854 B2 | 2/2004 | Helbing | |
| 6,697,787 B1 | 2/2004 | Miller | |
| 6,898,573 B1 | 5/2005 | Piehl | |
| 6,910,003 B1 | 6/2005 | Arnold | |
| 6,912,508 B1 | 6/2005 | McCalden | |
| 7,062,466 B2 * | 6/2006 | Wagner | G06Q 30/02 |
| | | | 348/460 |
| 7,234,103 B1 | 6/2007 | Regan | |
| 7,295,998 B2 | 11/2007 | Kulkarni | |
| 7,331,045 B2 | 2/2008 | Martin et al. | |
| 7,448,022 B1 | 11/2008 | Ram et al. | |
| 7,539,635 B1 * | 5/2009 | Peak | G06Q 10/00 |
| | | | 705/31 |
| 7,565,312 B1 | 7/2009 | Shaw | |
| 7,603,301 B1 | 10/2009 | Regan | |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 * | 4/2010 | Burlison | G06Q 40/02 |
| | | | 705/36 R |
| 7,716,094 B1 | 5/2010 | Sutter et al. | |
| 7,725,408 B2 | 5/2010 | Lee | |
| 7,742,958 B1 | 6/2010 | Leek | |
| 7,747,484 B2 | 6/2010 | Stanley | |
| 7,761,333 B2 | 7/2010 | Kapp | |
| 7,778,895 B1 | 8/2010 | Baxter | |
| 7,818,222 B2 * | 10/2010 | Allanson | G06Q 40/12 |
| | | | 705/31 |
| 7,849,405 B1 | 12/2010 | Coletta | |
| 7,860,763 B1 * | 12/2010 | Quinn | G06F 17/243 |
| | | | 705/30 |
| 7,865,829 B1 | 1/2011 | Goldfield | |
| 7,895,102 B1 | 2/2011 | Wilks et al. | |
| 7,899,757 B1 | 3/2011 | Talan | |
| 7,900,298 B1 * | 3/2011 | Char | G06Q 40/00 |
| | | | 5/31 |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,925,553 B2 * | 4/2011 | Banks | G06Q 40/12 |
| | | | 705/31 |
| 8,001,006 B1 * | 8/2011 | Yu | G06Q 20/00 |
| | | | 705/19 |
| 8,019,664 B1 | 9/2011 | Tifford et al. | |
| 8,082,144 B1 * | 12/2011 | Brown | G06Q 20/207 |
| | | | 704/9 |
| 8,086,970 B2 | 12/2011 | Achtermann et al. | |
| 8,108,258 B1 | 1/2012 | Slattery | |
| 8,126,820 B1 | 2/2012 | Talan | |
| 8,156,025 B1 | 4/2012 | Gymer | |
| 8,190,499 B1 | 5/2012 | McVickar | |
| 8,191,152 B1 | 5/2012 | Barker | |
| 8,204,768 B1 | 6/2012 | Grinberg | |
| 8,204,805 B2 | 6/2012 | Eftekhari | |
| 8,224,726 B2 | 7/2012 | Murray | |
| 8,234,562 B1 | 7/2012 | Evans | |
| 8,244,607 B1 | 8/2012 | Quinn | |
| 8,321,312 B2 | 11/2012 | Allanson et al. | |
| 8,346,635 B1 | 1/2013 | Olim | |
| 8,346,680 B2 | 1/2013 | Castleman | |
| 8,370,795 B1 | 2/2013 | Sage | |
| 8,386,344 B2 | 2/2013 | Christina | |
| 8,407,113 B1 | 3/2013 | Eftekhari | |
| 8,417,596 B1 * | 4/2013 | Dunbar | G06Q 40/10 |
| | | | 705/30 |
| 8,417,597 B1 | 4/2013 | McVickar | |
| 8,423,433 B1 | 4/2013 | Miller | |
| 8,447,667 B1 | 5/2013 | Dinamani et al. | |
| 8,452,676 B1 | 5/2013 | Talan | |
| 8,463,676 B1 | 6/2013 | Dinamani et al. | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Olim | |
| 8,560,409 B2 | 10/2013 | Abeles | |
| 8,577,760 B2 | 11/2013 | Rutsch et al. | |
| 8,583,516 B1 | 11/2013 | Pitt | |
| 8,589,262 B1 | 11/2013 | Gang | |
| 8,607,353 B2 | 12/2013 | Rippert et al. | |
| 8,612,318 B1 | 12/2013 | Blowers | |
| 8,635,127 B1 | 1/2014 | Shaw | |
| 8,639,616 B1 | 1/2014 | Rolenaitis | |
| 8,682,756 B1 | 3/2014 | Tifford et al. | |
| 8,682,829 B2 | 3/2014 | Barthel | |
| 8,694,395 B2 * | 4/2014 | Houseworth | G06Q 40/00 |
| | | | 705/31 |
| 8,706,580 B2 | 4/2014 | Houseworth | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,949,270 B2 | 2/2015 | Newton et al. | |
| 9,117,118 B1 | 8/2015 | Lewis | |
| 9,372,687 B1 | 6/2016 | Pai | |
| 9,406,089 B2 | 8/2016 | Mori | |
| 9,524,525 B2 * | 12/2016 | Manyam | G06Q 40/08 |
| 9,690,854 B2 | 6/2017 | Stent et al. | |
| 9,760,953 B1 | 9/2017 | Wang et al. | |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 10,096,072 B1 | 10/2018 | Ali | |
| 10,140,666 B1 | 11/2018 | Wang | |
| 10,157,426 B1 | 12/2018 | Wang | |
| 10,169,826 B1 | 1/2019 | Wang | |
| 10,176,534 B1 | 1/2019 | Mascaro | |
| 10,204,382 B2 | 2/2019 | Morin | |
| 2002/0022986 A1 | 2/2002 | Coker | |
| 2002/0023064 A1 | 2/2002 | Grimse | |
| 2002/0065831 A1 | 5/2002 | DePaolo | |
| 2002/0107698 A1 * | 8/2002 | Brown | G06Q 10/06375 |
| | | | 709/202 |
| 2002/0111888 A1 | 8/2002 | Stanley et al. | |
| 2002/0133410 A1 | 9/2002 | Hermreck et al. | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 * | 7/2003 | Phelps | G06Q 40/02 |
| | | | 700/36 |
| 2003/0174157 A1 | 9/2003 | Hellman | |
| 2003/0182102 A1 * | 9/2003 | Corston-Oliver | G06F 17/2881 |
| | | | 704/9 |
| 2004/0002906 A1 | 1/2004 | Von Drehnen et al. | |
| 2004/0019540 A1 | 1/2004 | William | |
| 2004/0019541 A1 | 1/2004 | William | |
| 2004/0021678 A1 | 2/2004 | Ullah et al. | |
| 2004/0078271 A1 | 4/2004 | Marano | |
| 2004/0083164 A1 | 4/2004 | Schwartz et al. | |
| 2004/0088233 A1 | 5/2004 | Brady | |
| 2004/0117395 A1 * | 6/2004 | Gong | G06N 5/04 |
| 2004/0172347 A1 * | 9/2004 | Barthel | G06Q 10/10 |
| | | | 705/31 |
| 2004/0181543 A1 | 9/2004 | Wu et al. | |
| 2004/0205008 A1 | 10/2004 | Haynie et al. | |
| 2004/0230397 A1 | 11/2004 | Chadwick | |
| 2005/0171822 A1 | 8/2005 | Cagan | |
| 2005/0216379 A1 | 9/2005 | Ozaki | |
| 2005/0228685 A1 | 10/2005 | Schuster | |
| 2005/0262191 A1 | 11/2005 | Mamou et al. | |
| 2006/0112114 A1 | 5/2006 | Yu | |
| 2006/0155618 A1 | 7/2006 | Wyle | |
| 2006/0155632 A1 | 7/2006 | Cherkas et al. | |
| 2006/0178961 A1 | 8/2006 | Stanley et al. | |
| 2006/0282354 A1 | 12/2006 | Varghese | |

(56) References Cited

U.S. PATENT DOCUMENTS

| | | |
|---|---|---|
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0055571 A1 | 3/2007 | Fox et al. |
| 2007/0094207 A1 | 4/2007 | Yu |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0189197 A1 | 8/2008 | Allanson et al. |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff et al. |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0192827 A1 | 7/2009 | Andersen |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendort et al. |
| 2010/0100561 A1 | 4/2010 | Cooper |
| 2010/0131394 A1 | 5/2010 | Rutsch |
| 2010/0153138 A1 | 6/2010 | Evans |
| 2010/0169359 A1 | 7/2010 | Barrett |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258213 A1 | 10/2011 | Pollara |
| 2011/0258610 A1 | 10/2011 | Aaraj et al. |
| 2011/0264569 A1 | 10/2011 | Houseworth et al. |
| 2011/0284213 A1 | 11/2011 | Kowalewski |
| 2012/0016817 A1 | 1/2012 | Smith et al. |
| 2012/0027246 A1 | 2/2012 | Tifford et al. |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari ............... G06Q 40/02 705/31 |
| 2012/0109793 A1 | 5/2012 | Abeles |
| 2012/0136764 A1 | 5/2012 | Miller et al. |
| 2012/0278365 A1 | 11/2012 | Labat et al. |
| 2013/0030839 A1 | 1/2013 | Opfer |
| 2013/0036347 A1 | 2/2013 | Eftekhari et al. |
| 2013/0080302 A1 | 3/2013 | Allanson |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula et al. |
| 2014/0058763 A1 | 2/2014 | Zizzamia |
| 2014/0067949 A1 | 3/2014 | Dearlove |
| 2014/0108213 A1 | 4/2014 | Houseworth |
| 2014/0149303 A1 | 5/2014 | Band |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1* | 8/2014 | Howell ............... G06Q 40/10 705/31 |
| 2014/0337189 A1 | 11/2014 | Barsade et al. |
| 2015/0066715 A1 | 3/2015 | Carrier |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0162456 A1 | 6/2016 | Munro |
| 2016/0162459 A1 | 6/2016 | Parker |
| 2016/0247239 A1 | 8/2016 | Houseworth |
| 2016/0275627 A1 | 9/2016 | Wang |
| 2016/0283353 A1 | 9/2016 | Owen |
| 2017/0004583 A1 | 1/2017 | Wang |
| 2017/0004584 A1 | 1/2017 | Wang |
| 2017/0032468 A1 | 2/2017 | Wang |
| 2017/0046492 A1 | 2/2017 | Renner |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | WO 2017/004094 | 1/2017 |
| WO | WO 2017/004095 | 1/2017 |
| WO | WO 2017/019233 | 2/2017 |
| WO | WO 2017/116496 | 7/2017 |
| WO | WO 2017/116497 | 7/2017 |
| WO | WO 2018/022023 | 2/2018 |
| WO | WO 2018/022128 | 2/2018 |
| WO | WO 2018/080562 | 5/2018 |
| WO | WO 2018/080563 | 5/2018 |

OTHER PUBLICATIONS

Wikipedia, https://en.wikipedia.org/wiki/Tree_(data_structure), "Tree (data structure)", May 15, 2005, entire page (Year: 2005).*

Janet M. Six. "Going Mobile: Designing for Different Screen Sizes | Promoting Your Mobile App" downloaded from https://www.uxmatters.com/mt/archives/2010/10/going-mobile-designing-for-different-screen-sizes-promoting-your-mobile-app.php , 2010.*

Notice of Allowance and Fee(s) Due dated May 5, 2017 in U.S. Appl. No. 14/206,682, (30pages).

PCT International Search Report for PCT/US2016/044094, Applicant: Intuit Inc., Form PCT/ISA/210 and 220, dated Apr. 24, 2017 (5pages).

PCT Written Opinion of the International Search Authority for PCT/US2016/044094, Applicant: Intuit Inc., Form PCT/ISA/237, dated Apr. 24, 2017 (5pages).

PCT International Search Report for PCT/US2016/067839, Applicant: Intuit Inc., Form PCT/ISA/210 and 220, dated Apr. 25, 2017 (5pages).

PCT Written Opinion of the International Search Authority for PCT/US2016/067839, Applicant: Intuit Inc., Form PCT/ISA/237, dated Apr. 26, 2017 (12pages).

Amendment dated May 3, 2017 in U.S. Appl. No. 14/462,411, filed Aug. 18, 2014, (5pages).

(56) References Cited

OTHER PUBLICATIONS

Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports-graphs-and-snapshots/track-the-earnings-taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015 inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
http://en.wikipedia.org/wiki/Dependency_grammar#Semantic_dependencies, printed Mar. 11, 2014 (15 pages).
http://www.webopedia.com/TERM/L/loose_coupling.html, printed Mar. 11, 2014 (2 pages).
http://en.wikipedia.org/wiki/Loose_coupling, printed Mar. 11, 2014 (4 pages).
www.turbotax.com, printed Mar. 11, 2014 (7 pages).
https://turbotax.intuit.com/snaptax/mobile/, printed Mar. 11, 2014 (2 pages).
http://www.jboss.org/drools/drools-expert.html, printed Mar. 11, 2014 (5 pages).
http://en.wikipedia.org/wiki/Drools, printed Mar. 11, 2014 (4 pages).
http://en.wikipedia.org/wiki/Declarative_programming, printed Mar. 11, 2014 (4 pages).
http://www.wisegeek.com/what-is-declarative-programming.htm, printed Mar. 11, 2014 (2 pages).
http://docs.jboss.org/drools/release/5.3.0.Final/drools-expert-docs/html/ch01.thtml, printed Mar. 11, 2014 (10 pages).
TurboTax TaxCaster 2012, printed Aug. 28, 2013 (1 page).
Office Action dated Dec. 12, 2014 in U.S. Appl. No. 14/014,172, filed Aug. 29, 2013, (28 pages).
Amendment filed Mar. 12, 2015 in U.S. Appl. No. 14/014,172, filed Aug. 29, 2013, (22 pages).
Office Action dated Nov. 5, 2014 in U.S. Appl. No. 13/955,959, filed Jul. 31, 2013, (15 pages).
Amendment filed Jan. 30, 2015 in U.S. Appl. No. 13/955,959, filed Jul. 31, 2013, (18 pages).
H&R Block Newsroom, "H&R Block's redesigned DIY product offers consumers new features for best value" dated Jan. 9, 2015 (3 pages).
H&R Block Newsroom, "It's All About the Refund: H&R Block Empowers Do-It-Yourselfers with New Tools, Boosts Refund" dated Dec. 8, 2014 (3 pages).
Wikipedia "Mouseover" wikipedia.org. http:en.wikipedia.org/wiki/Mouseover.Dec. 15, 2005.

(56) References Cited

OTHER PUBLICATIONS

Wikipedia "Mouse Button" wikipedia.org. http://en.wikipedia.org/wiki/Mouse_button. Jul. 8, 2010.
Ager, Simon "Buliding multilingual websites". Omniglot. http://www.omniglot.com/language/articles/multilingual_websites.htm. Aug. 13, 2006.
WebNMS "Defining Thresholds" Zoho Corp. http://www.webnms.com/webnms/help/administrator_guid/performance/thresholds/perf_thresholdsintro.html. Nov. 14, 2012 (3 pages).
Plasma.com "Panasonic PT-L78ONTU XGA 3200 ANSI Lumens LCD Vido Projector" Plasma.com. http://plasma.com/panasonicprojectors/ptl780.htm. Jun. 9, 2003 (3 pages).
Microsoft. "How to Display Hierarchical Data by using Nested Repeater Controls and Visual C#. NET" Microsoft Corp. http://support.microsoft.com/kb/306154. Jan. 8, 2007 (5 pages).
O'Reilly "Types of Graphics File Formats" http://www.fileformat.info/mirror/egff/ch01_04.htm. Encyclopedia of Graphics File Formats Feb. 16, 2005 (6 pages).
Wingenbach, Gary "Using Charts and Graphs" Texas A&M University, Agricultural Communications and Journalism, Oct. 13, 2008 (1 page).
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Response dated Sep. 21, 2017 in U.S. Appl. No. 14/448,481, (44pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).

(56) References Cited

OTHER PUBLICATIONS

Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Vanderbilt University, "Free tax prep help available for Vanderbilt employees", Feb. 6, 2014, Vanderbilt University, p. 1-3.
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Solomon L. Pollack; Analysis of the Decision Rules in Decision Tables, May 1963; The Rand Corporation; (1963), 78 Pages.
Cronin, Julie-Anne et al., Distributing the Corporate Income Tax: Revised U.S. Treasury Methodology, May 2012, Department of Treasury, web, 2-31 (2012), 34 pages.
H.R. Gregg; Decision Tables for Documentation and System Analysis; Oct. 3, 1967; Union Carbide Corporation, Nuclear Division, Computing Technology Center: (Year: 1967) 25 pages.
U.S. Appl. No. 14/553,347, filed Nov. 25, 2014.
U.S. Appl. No. 14/553,347, filed Nov. 25, 2014 (Jul. 12, 2019 to Aug. 30, 2019).
U.S. Appl. No. 15/335,326, filed Oct. 26, 2016 (Jul. 12, 2019 to Aug. 30, 2019).
U.S. Appl. No. 14/530,159, filed Oct. 31, 2014.
U.S. Appl. No. 14/553,347, filed Nov. 25, 2014, Issued.
U.S. Appl. No. 15/335,326, filed Oct. 26, 2016, Pending.
U.S. Appl. No. 16/226,507, filed Dec. 19, 2018, Pending.
U.S. Appl. No. 14/530,159, filed Oct. 31, 2014, Issued.
U.S. Appl. No. 15/221,511, filed Jul. 27, 2016, Pending.
U.S. Appl. No. 15/221,495, filed Jul. 27, 2016, Pending.

(56) References Cited

OTHER PUBLICATIONS

U.S. Appl. No. 15/221,471, filed Jul. 27, 2016, Pending.
U.S. Appl. No. 15/221,520, filed Jul. 27, 2016, Pending.
U.S. Appl. No. 15/335,294, filed Oct. 26, 2016, Pending.
U.S. Appl. No. 14/553,347, filed Nov. 25, 2014, Allowed.
U.S. Appl. No. 15/335,326, filed Oct. 26, 2016.
U.S. Appl. No. 16/226,507, filed Dec. 19, 2018.
U.S. Appl. No. 15/221,511, filed Jul. 27, 2016.
U.S. Appl. No. 15/221,495, filed Jul. 27, 2016.
U.S. Appl. No. 15/335,294, filed Oct. 26, 2016.
U.S. Appl. No. 15/221,471, filed Jul. 27, 2016.
U.S. Appl. No. 15/221,520, filed Jul. 27, 2016.
U.S. Appl. No. 15/335,294, filed Oct. 26, 2016 (dated Jul. 9, 2020-present).
U.S. Appl. No. 15/221,495, filed Jul. 27, 2016 (dated Aug. 25, 2020-present).

* cited by examiner

FIG. 3 —Transform→

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

ACA Topic — 119
ZIP Code: 92129
AGI: 50,000 — 118
Tax Exempt Interest: 500
Exemption? NO
Coverage? NO PLAN ⊖ Shared Responsibility Penalty is $405 because Deficit in Coverage caused ACA Penalty to apply and then was no exemption. — 116

⊕ Calculated ACA Penalty ($405) is $310 above minimum penalty and $394 below maximum penalty — 116a

ACA Topic — 119
ZIP Code: 92129
AGI: 50,000 — 118
Tax Exempt Interest: 500
Exemption? NO
Coverage? NO PLAN ⊖ Shared Responsibility Penalty is $405 because Deficit in Coverage caused ACA Penalty to apply and then was no exemption. — 116

⊖ Calculated ACA Penalty ($405) is $310 above minimum penalty and $394 below maximum penalty — 116a ⊕ Calculated ACA Penalty ($405) is 1% of taxable income ($40,500.00) — 116b

— 104

SYSTEM AND METHOD FOR GENERATING EXPLANATIONS FOR YEAR-OVER-YEAR TAX CHANGES

SUMMARY

In one embodiment, a computer-implemented method for generating an explanation or other visual indicia reflective of changes in tax liability over different tax reporting periods (e.g., year-over-year) is provided. The method uses a computing device executing a tax calculation engine that operates as part of or in connection with the tax preparation software. The tax calculation engine operates on two different sets tax calculation graphs for different tax reporting periods (e.g., tax year) to perform respective tax calculations. For example, there may be a current year tax calculation graph and a prior year tax calculation graph for the immediately preceding tax year, although as explained herein, a preceding year may include any number or prior tax years and not necessarily the immediately preceding tax year.

Each tax calculation graph semantically describes the data dependent tax operations comprising functional nodes connected to input nodes by one of a plurality of functions, wherein each tax operation is associated with one or more explanations. According to one aspect of the invention, the respective tax calculation graphs for the different tax reporting periods are different in some respect. For example, one or more of the internal functional nodes of the respective tax calculation graphs may be deleted or added. Alternatively, a function that is associated with or between particular nodes may be different even though the "skeletal" or topological structure of the tax calculation graphs may be the same. The changes in the tax calculation graphs may arise out of, for example, changes in tax legislation or rules that change from year to year.

In one aspect of the invention, the computing device executes an explanation engine that is part of or associated with the tax preparation software to generate a textual explanation associated with one or more changes in the tax calculation for the current year and a prior year (e.g., year-over-year comparison). The textual explanation may be optionally associated with a numerical value. The textual explanation may be a narrative explanation that is presented to a user of the device. The explanation may be presented to the user on a display associated with the computing device or another electronic device.

The methods and systems described herein may be used to compare a current tax year with the immediately preceding year which is typically referred to as a year-over-year comparison. The preceding year may also include a year that is even older than the immediately preceding tax year. The current tax year may include a completed current year or it may include a partial tax year that is estimated or projected on a full year basis. The current tax year could also be compared to an earlier tax year than the immediately preceding tax year. In still another alternative, multiple prior years may also be compared to one another. In yet another alternative, a future year may be compared to a current year or even a prior year. In many instances, tax laws and regulations are known well in advance of their actual implementation. Appropriate tax calculation graphs can be constructed in advance and utilized to compare future tax scenarios.

BRIEF DESCRIPTION OF THE DRAWINGS

FIG. 4 illustrates a decision table based on or derived from the completeness graph of FIG. 3.

FIGS. 11A and 11B illustrate a display of a computing device along with a narrative explanation that was generated by the explanation engine according to one embodiment.

The narrative explanation contains multiple phrases that are linked that can be selected to provide additional detailed explanations.

Figure 12A:
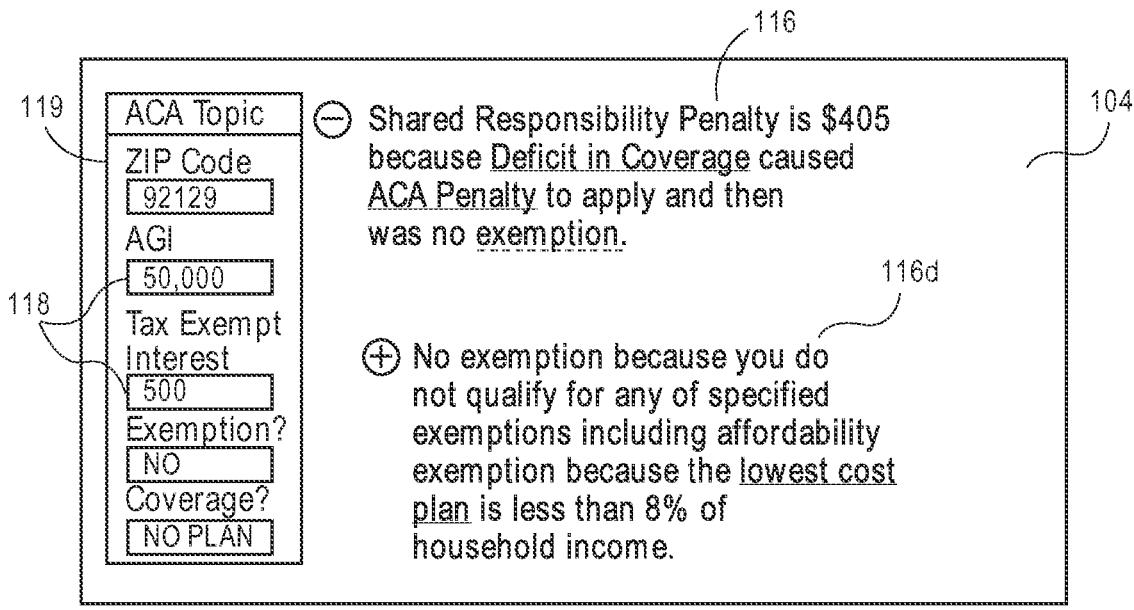

FIG. 12A illustrates a display of a computing device along with a narrative explanation that was generated by the explanation engine according to one embodiment. The narrative explanation contains multiple phrases that are linked that can be selected to provide additional detailed explanations.

Figure 12B:
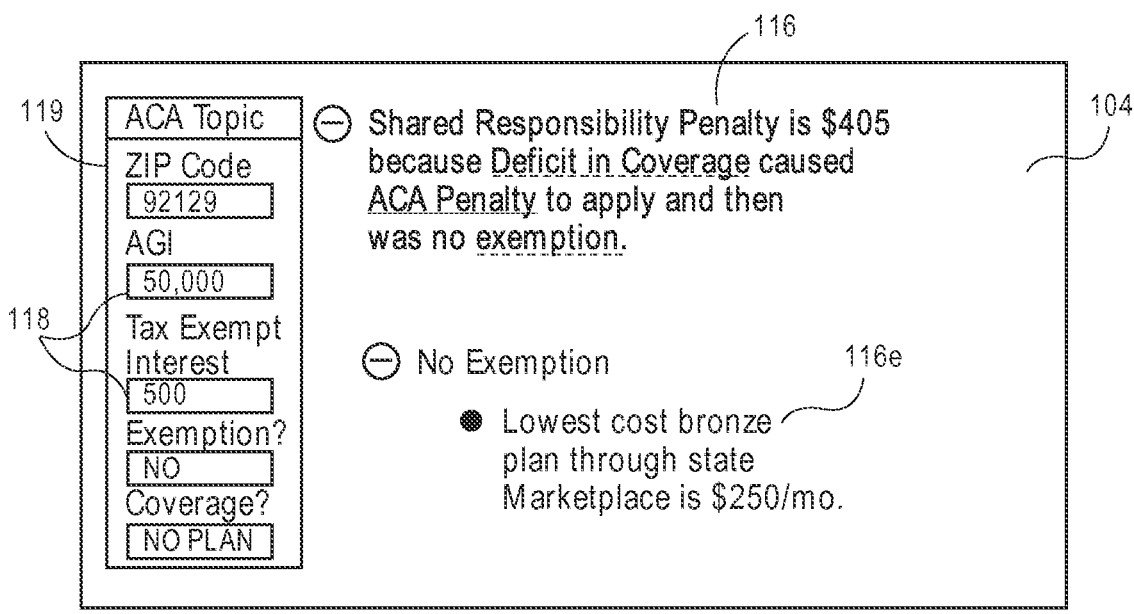

FIG. 12B illustrates a display of a computing device along with a narrative explanation that was generated by the explanation engine according to one embodiment. The narrative explanation contains multiple phrases that are linked that can be selected to provide additional detailed explanations.

Figure 12C:
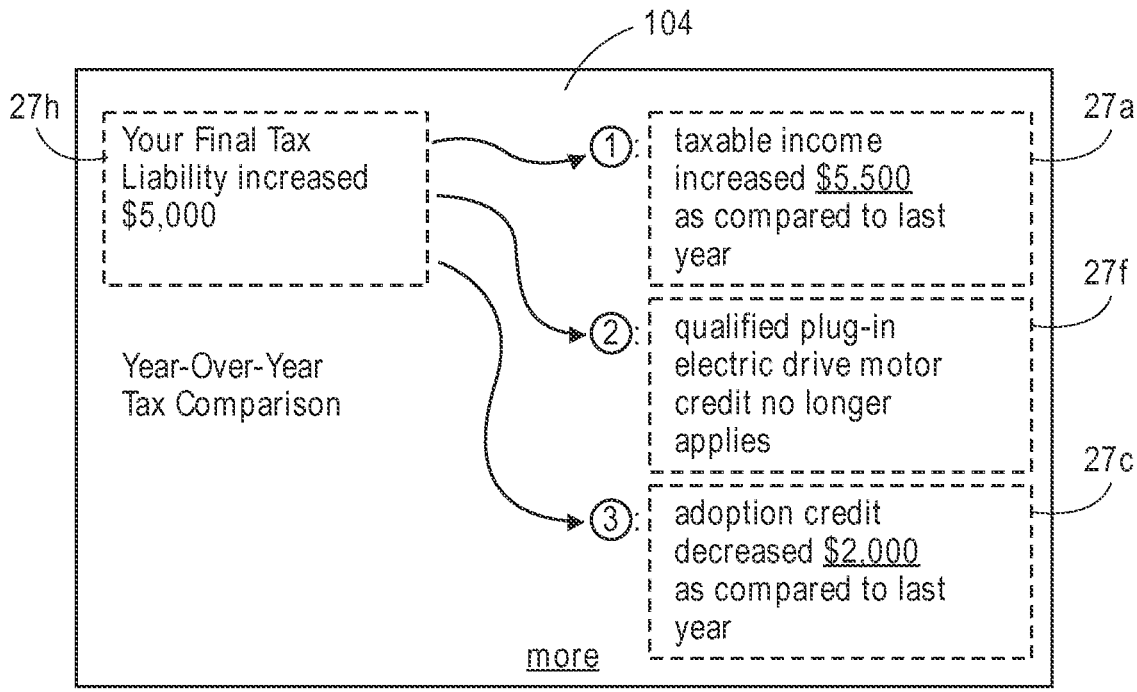

FIG. 12C illustrates a display of a computing device that illustrates various explanations for performing a year-over-year tax comparison.

Figure 12D:
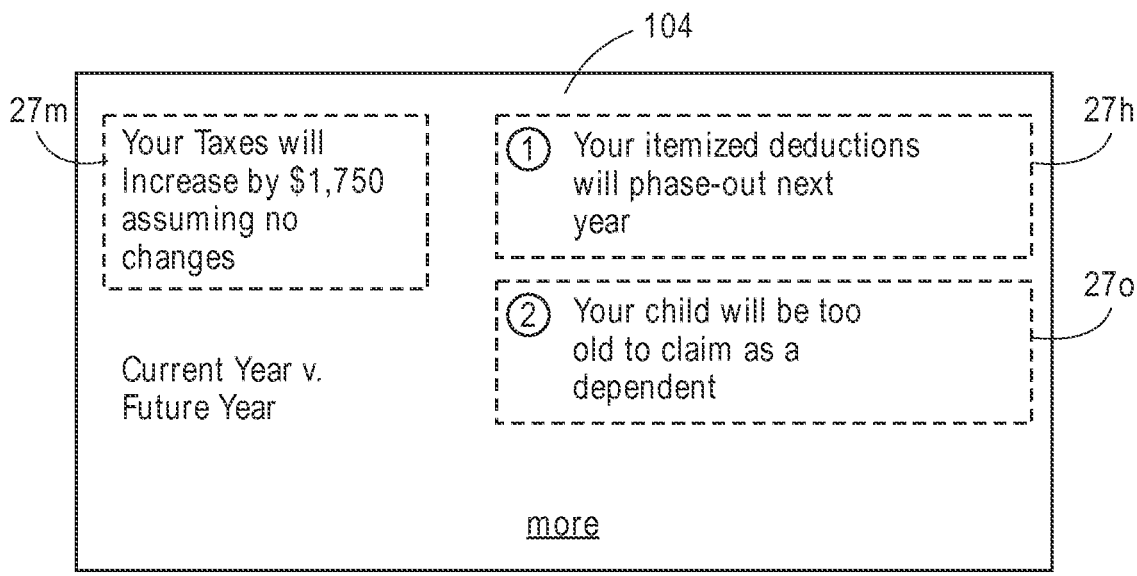

FIG. 12D illustrates a display of a computing device that illustrates various explanations for performing a comparison based on changes in tax laws or regulations between a current year and a future year.

Figure 13:
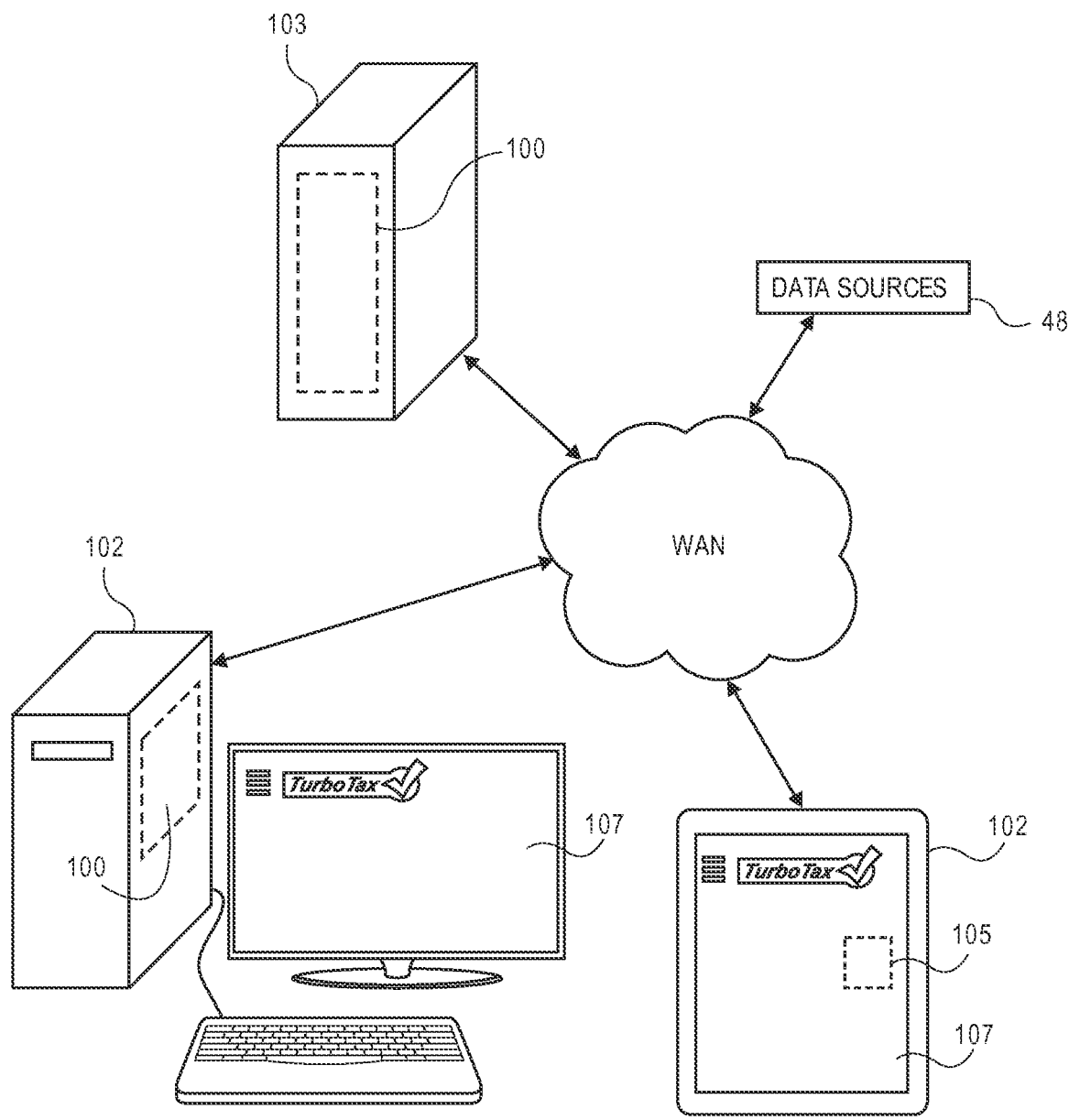

FIG. 13 illustrates the implementation of tax preparation software on various computing devices according to one embodiment.

Figure 14:
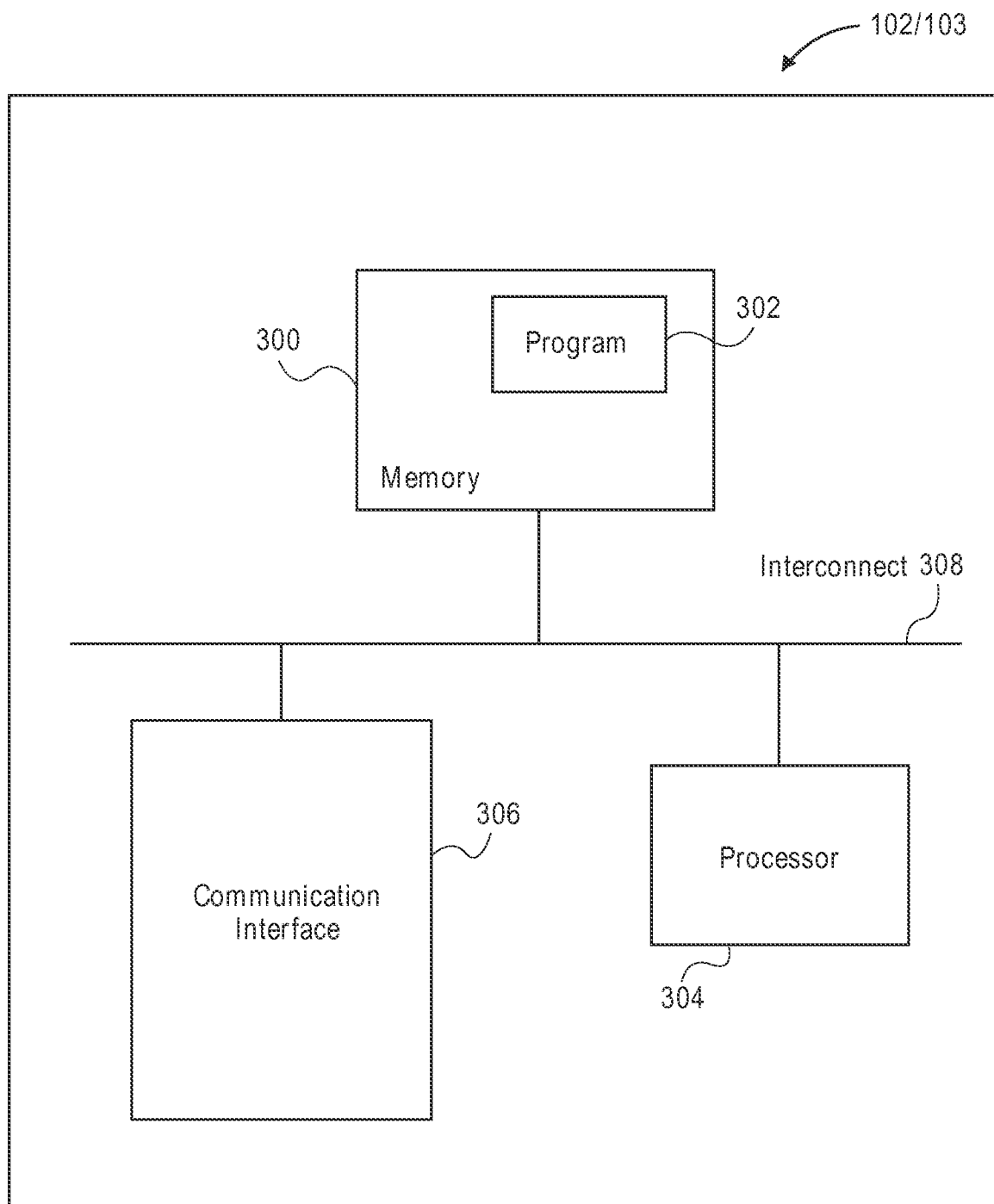

FIG. 14 illustrates generally the components of a computing device that may be utilized to execute the software for automatically calculating or determining tax liability and preparing a tax return based thereon according to one embodiment.

DETAILED DESCRIPTION OF ILLUSTRATED EMBODIMENTS

Tax preparation is a time-consuming and laborious process. It is estimated that individuals and businesses spend around 7 billion hours per year complying with the filing requirements set by the Internal RevenueService. Tax preparation software has been commercially available to assist taxpayers in preparing their tax returns. Tax preparation software is typically run on a computing device such as a computer, laptop, tablet, mobile computing device such as a Smartphone, or remotely on another computer and accessed via a network. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, more recent iterations provide tax preparation software 100 that runs on computing devices 102, 103 (as seen in FIG. 13) that operates on a new construct in which tax rules and the calculations based thereon are established in declarative data-structures, namely, one or more completeness graphs 12 and one or more tax calculation graphs 14. Completeness graphs 12 and tax calculation graphs 14 are data structures in the form of graphs having interconnecting nodes in which arcs are directed from one node to another. Completion graphs 12 identify when all conditions have been satisfied to complete a particular tax topic or, collectively, produce a fileable tax return. The tax calculation graph 14 semantically describes data dependent tax operations that perform a tax calculation or operation in accordance with the tax code or tax rules. Examples of these data structures may be found in U.S. patent application Ser. Nos. 14/097,057 and 14/448,886, both of which are incorporated by reference as if set forth fully herein. Use of these data-structures permits the user experience to be loosely connected or even divorced from the tax calculation engine and the data used in the tax calculations. Tax calculations are dynamically calculated based on tax data derived from sourced data, estimates, user input. During the tax calculation process intermediate tax calculations are often performed that are then utilized for additional tax calculations. For example, a result of an intermediate tax calculation may be used as an input for a further downstream tax calculation. For example, in order to calculate a tax liability one needs to calculate the taxable income of the taxpayer. Taxable income, however, is derived from a taxpayer's adjusted gross income after taking into account, for example itemized deductions and exemptions. In the context of the present invention, these tax concepts are embodied within a tax calculation graph or linked tax calculation graphs. In many cases, the output of a particular node is used as an input for another node or other nodes as part of tax calculations.

The completion graphs 12 identify when a particular tax topic has been completed or additional information is needed. A smart tax logic agent running on a set of rules can review current run time data and evaluate missing data fields as identified by the completion graphs 12 and propose suggested questions to be asked to a user to fill in missing blanks. This process can be continued until completeness of all tax topics has occurred. An electronic return can then be prepared and filed with respect to the relevant taxing jurisdictions.

According to one aspect of the invention, a computer-implemented method for generating an explanation or other visual indicia reflective of changes in tax liability over different tax reporting periods (e.g., year-over-year) is provided. The method uses a computing device executing a tax calculation engine that operates as part of or in connection with the tax preparation software. The tax calculation engine operates on a different tax calculation graphs for different tax reporting periods (e.g., different tax years) to perform respective tax calculations. For example, there may be a current year tax calculation graph and a prior year tax calculation graph for the immediately preceding tax year.

Figure 1:
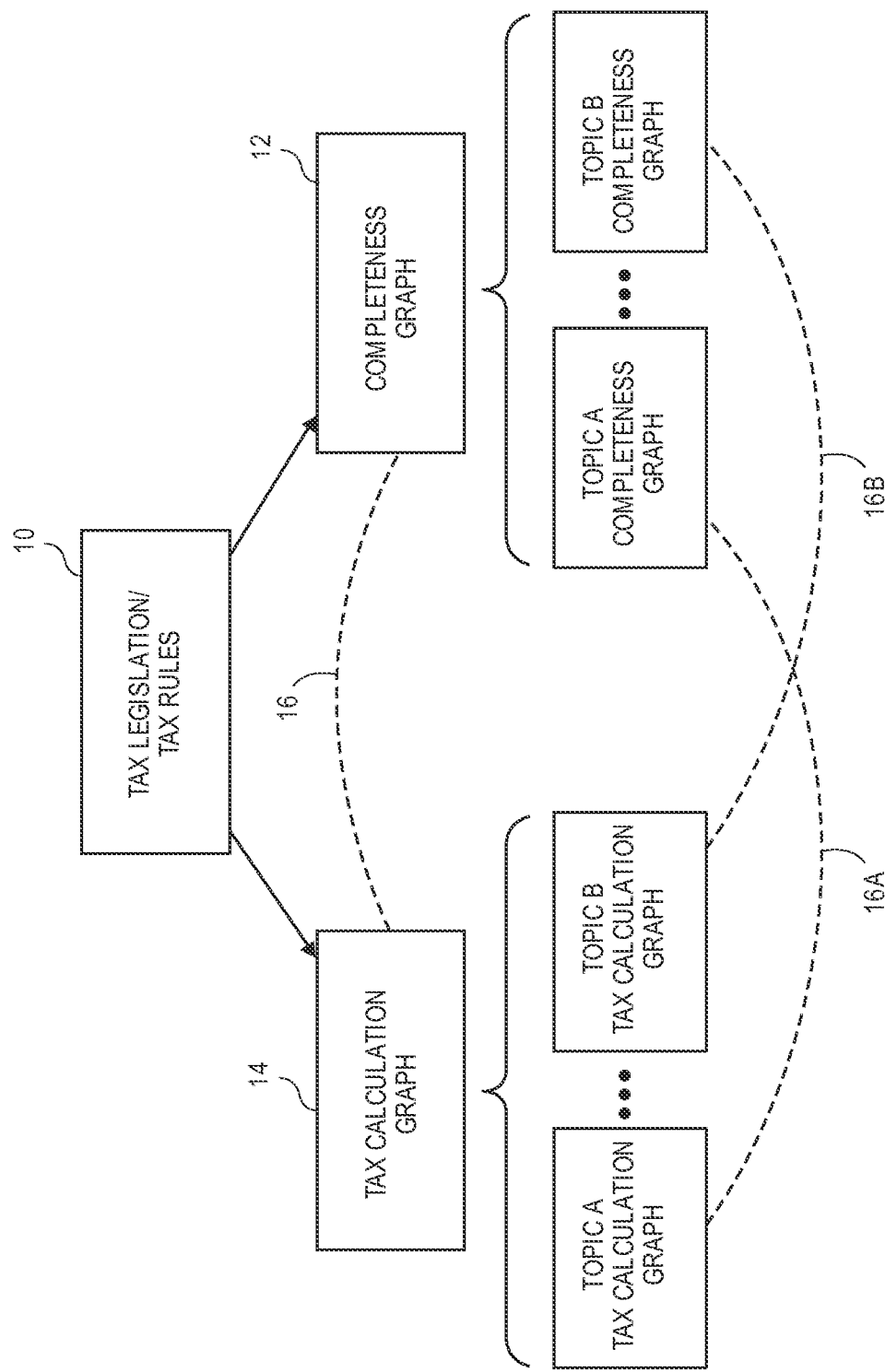
FIG. 1 schematically illustrates according to one embodiment how tax legislation and tax rules are parsed and represented by a completeness graph and a tax calculation graph.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph(s) 12 and the tax calculation graph(s) 14 represent collective data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI), Taxable Income (TI), itemized deductions, tax credits, and the like.

Figure 2:
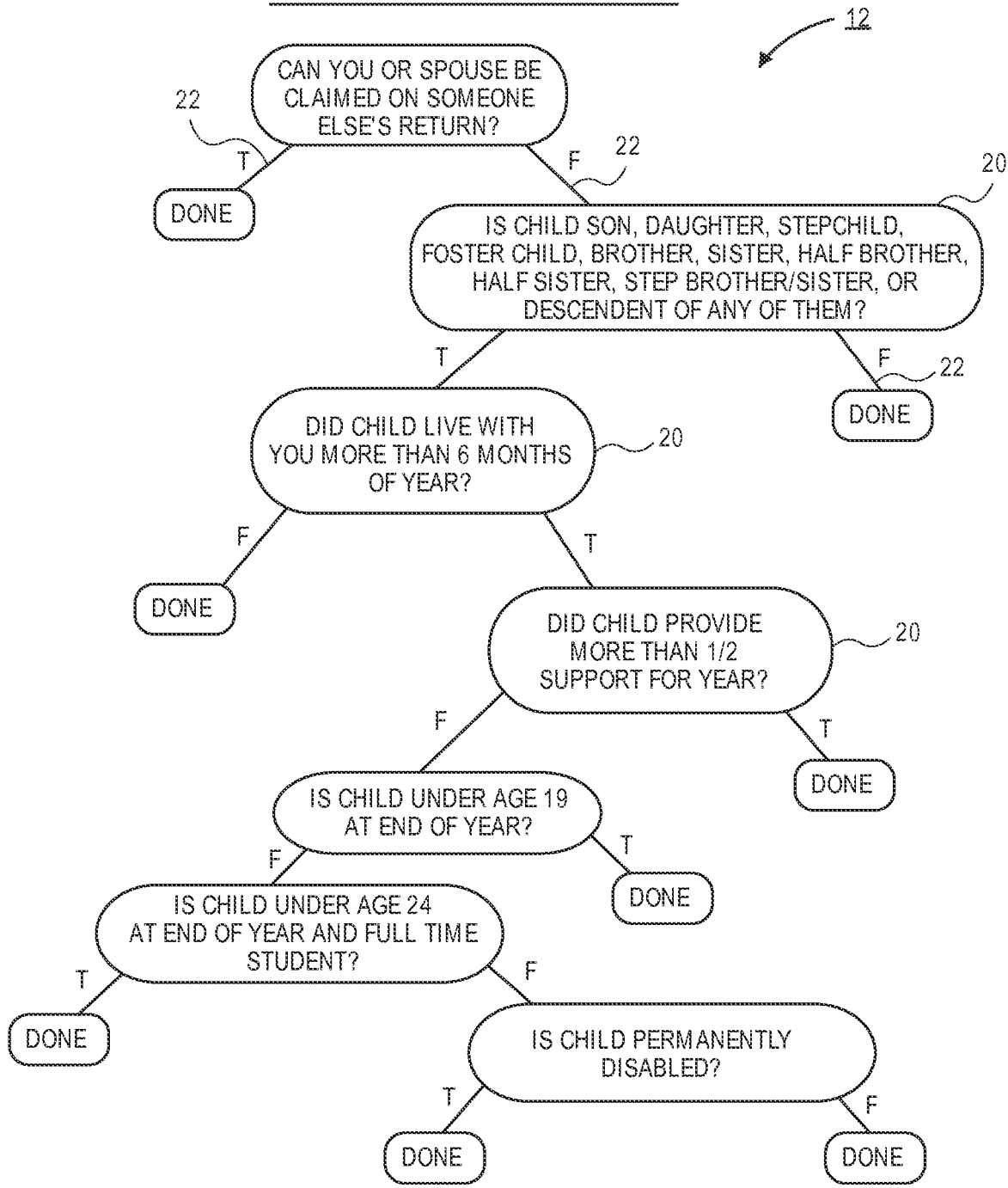
FIG. 2 illustrates an example of a simplified version of a completeness graph according to one embodiment related to a qualifying child for purposes of determining deductions for federal income tax purposes.

The completeness graph 12 and the tax calculation graph 14 represent data structures that can be constructed in the form of tree. FIG. 2 illustrates a completeness graph 12 in the form of a tree with nodes 20 and arcs 22 representing a basic or general version of a completeness graph 12 for the topic of determining, for example, whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition or state that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than six months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, by many branches or lines within the completeness graph 12 can be ignored, for example, when certain questions internal to the completeness graph 12 are answered that logically eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 3:
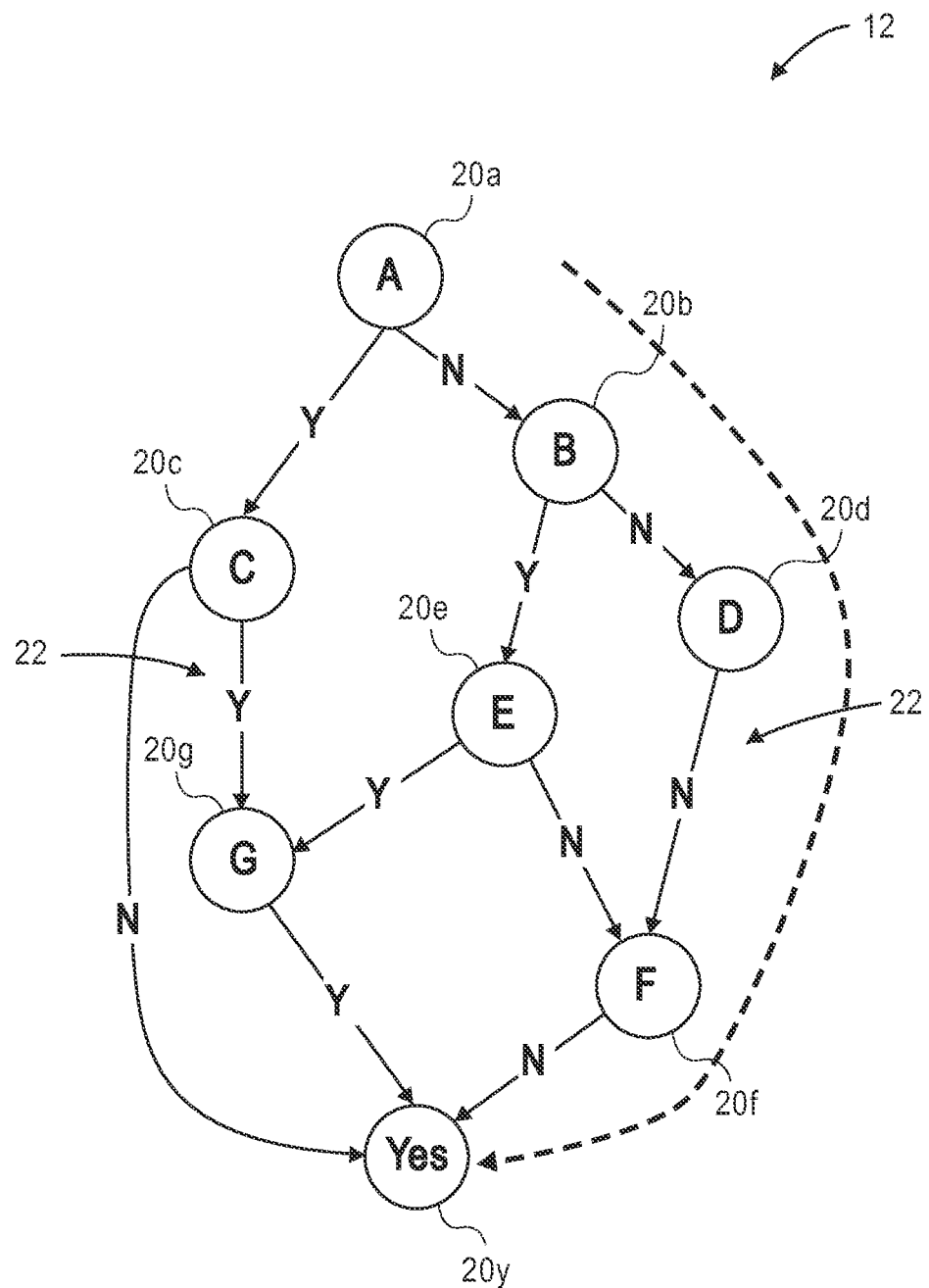
FIG. 3 illustrates another illustration of a completeness graph according to one embodiment.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner one can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule (or local tax rule). In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

Figure 5:
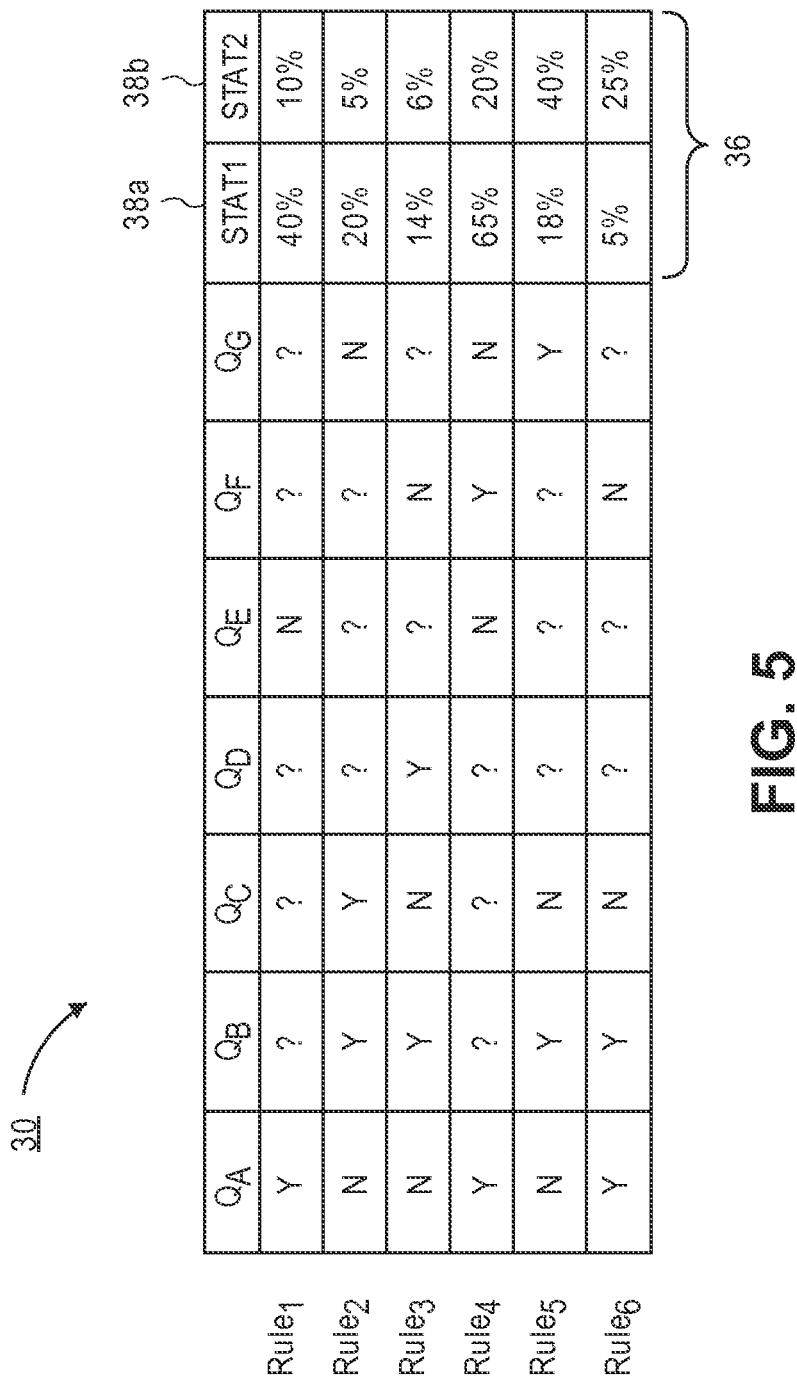
FIG. 5 illustrates another embodiment of a decision table that incorporates statistical data.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer. Predictive models based on the statistical data 36 may be used to determine candidate questions.

Figure 6A:
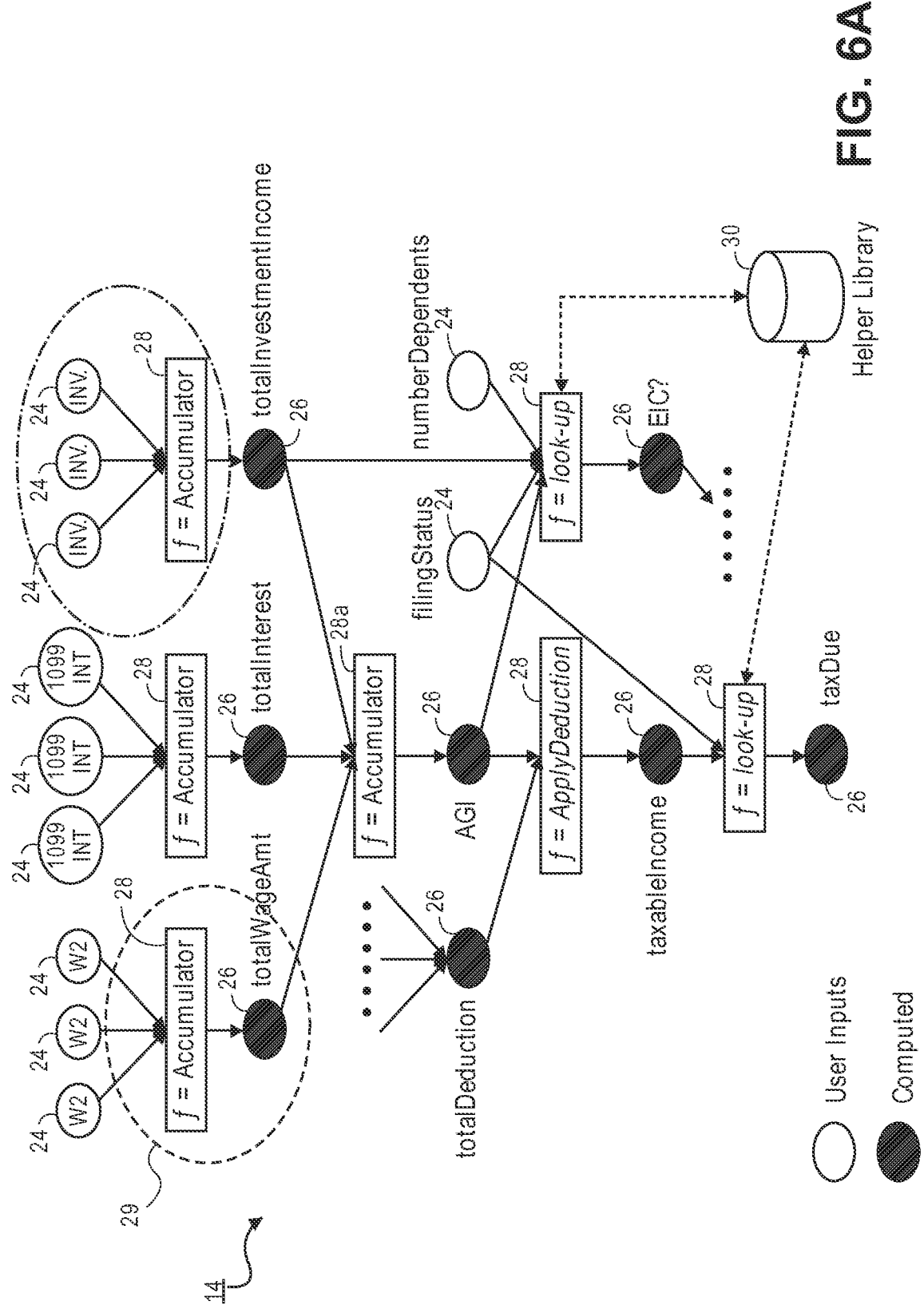
FIG. 6A illustrates an example of a tax calculation graph according to one embodiment.

FIG. 6A illustrates one example of a tax calculation graph 14. The tax calculation graph 14 semantically describes data dependent tax operations that used perform a tax calculation in accordance with the tax code or tax rules 10. The tax calculation graph 14 in FIG. 6A is a simplified view of data dependent tax operations that are used to determine the taxes Due (taxDue) based on various sources of income, deductions, exemptions, and credits. The tax calculation graph 14 is a type of directed graph and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user taxpayer will enter this information from a user interface as described herein. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, dependents, address, and social security number) which can then be used to populate the leaf nodes 24 or other nodes. Online resources such as financial services websites or other user-specific websites can be crawled and scanned to scrape or otherwise download tax related information that can be automatically populated into leaf nodes 24. Additional third party information sources such as credit bureaus, government databases, social media websites and the like can also be used by the tax preparation software 100 to obtain information that can then be populated in to respective leaf nodes 24.

In still other embodiments, values for leaf nodes 24 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes referred to as functional nodes 26 semantically represent a tax concept and may be calculated or otherwise determined using a function 28. The functional node 26 and the associated function 28 define a particular tax operation 29. For example, as seen in FIG. 6A, operation 29 refers to total wage income and is the result of the accumulator function 28 summing all W-2 income from leaf nodes 24 containing W-2 inputs. The functional node 26 may include a number in some instances. In other instances, the functional node 26 may include a response to a Boolean expression such as "true" or "false." The functional nodes 26 may also be constant values in some instances. Some or all of these functional nodes 26 may be labelled as "tax concepts" or "tax topics." The combination of a functional node 26 and its associated function 28 relate to a specific tax operation as part of the tax topic.

Interconnected function nodes 26 containing data dependent tax concepts or topics are associated with a discrete set of functions 28 that are used to capture domain specific patterns and semantic abstractions used in the tax calculation. The discrete set of functions 28 that are associated with any particular function node 26 are commonly reoccurring operations for functions that are used throughout the process of calculating tax liability. For example, examples of such commonly reoccurring functions 28 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between function nodes 26 can be called upon by the tax preparation software 100 for performing tax calculations. Utilizing these common functions 28 greatly improves the efficiency of the tax preparation software 100 can be used by programmer to more easily track and follow the complex nature of the ever-evolving tax code. The common functions 28 also enables easier updating of the tax preparation software 100 because as tax laws and regulations change, fewer changes need to be made to the software code as compared to prior hard-wired approaches.

Importantly, the tax calculation graph 14 and the associated function nodes 26 and functions 28 can be tagged and later be used or called upon to intelligently explain to the user the reasoning behind why a particular result was calculated or determined by the tax preparation software 100 program as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function 28 may also include any number of mathematical or other operations. Examples of functions 28 include summation, subtraction, multiplication, division, and comparisons, greater of, lesser of, at least one of, calling of look-ups of tables or values from a database 30 or library as is illustrated in FIG. 6A. It should be understood that the function nodes 26 in the tax calculation graph 14 may be shared in some instances. For example, AGI is a reoccurring tax concept that occurs in many places in the tax code. AGI is used not only for the mathematical computation of taxes it is also used, for example, to determine eligibility of certain tax deductions and credits. The AGI function node 26 may be found in multiple locations within the tax calculation graph 14 (or appropriate pointers thereto). Taxable income is another example of such a function node 26.

Figure 6B:
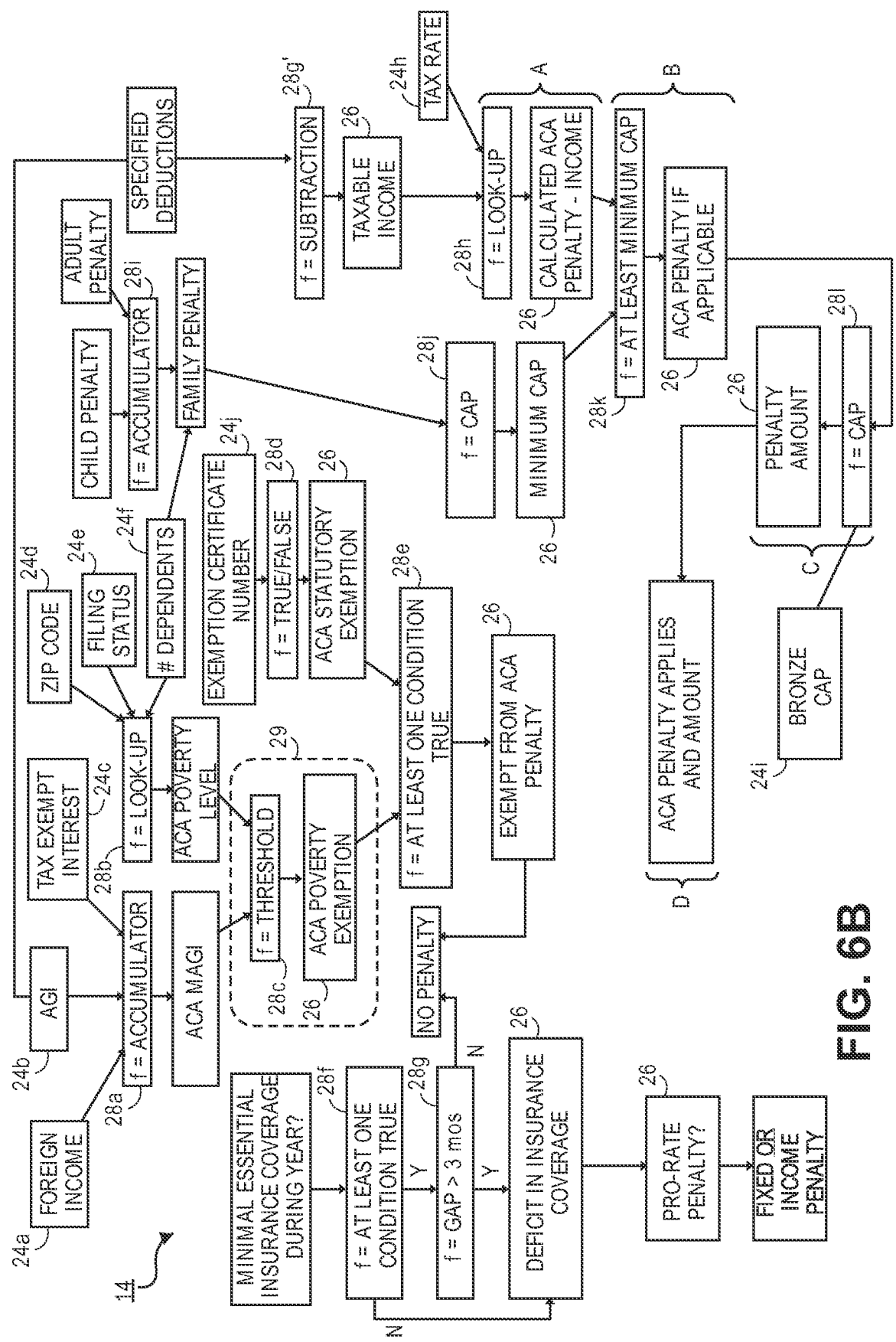
FIG. 6B illustrates an example of a tax calculation graph that relates to the determination and calculation of a shared responsibility penalty under the Affordable Care Act according to one embodiment.

FIG. 6B illustrates an example of a tax calculation graph 14 that is used to calculate the amount of penalty under the Affordable Care Act (ACA). Under the ACA, taxpayers are required to have minimum essential health coverage for each month of the year, qualify for an exemption, or make a shared responsibility penalty payment when filing his or her federal tax return. FIG. 6B illustrates a flowchart illustration of a process used to calculate a taxpayer's shared responsibility payment under the ACA (referred to herein as an ACA penalty). FIG. 6B illustrates, for example, various leaf nodes 24a-24j used as part of this calculation to determine the ACA penalty. Leaf nodes 24a-24f are used to calculate the modified adjusted gross income (ACA MAGI) as well as the applicable ACA poverty level. One can see how the accumulator function 28a is used to generate the ACA MAGI in this example by adding foreign income 14a, AGI 24b, and tax exempt interest 24c. Likewise, a look-up function 28b can be used to determine the applicable ACA poverty level based on the taxpayer's zip code 24d, filing status 24e, and number of dependents 24f. The ACA MAGI and the ACA poverty level are then subject to a thresholding function 28c to determine whether the ACA poverty level exemption applies. Under the ACA, if a taxpayer cannot afford basic coverage because the minimum amount one must pay for the premiums exceeds a percentage of household income (i.e., 8%), one is exempt from obtaining minimum essential coverage.

Still referring to FIG. 6B, a taxpayer may be exempt from the requirement to obtain minimum essential coverage by obtaining a different statutory exemption. These exemptions include: religious conscience, health care sharing ministry, a member of Indian tribe, short coverage gap (less than 3 consecutive months), hardship, affordability (already mentioned above), incarceration, and not lawfully present. A true/false Boolean function 28d may be used to determine whether an Exemption Certificate Number (ECN) 24j has been obtained from the taxpayer certifying that one of the statutory exemptions has been satisfied. Another threshold function 28e is applied to determine whether one of the statutory exemptions is satisfied (e.g., affordability or others). If at least one of these statutory conditions is met then the taxpayer is exempt from the ACA shared responsibility payment penalty.

As seen in FIG. 6B, if a taxpayer has obtained minimal essential coverage during the year, there is still the possibility that a penalty may be owed because under the ACA, if there is a gap in coverage for a covered member of the family of more than three (3) months, at least some penalty amount is owed. Function 28f (at least one condition true) is used to determine if there was minimum essential coverage during the year for any period. Function 28g (gap>3 months) is used to determine the gap in coverage in order to gaps in coverage that exceed the 3 month statutory requirement. The gap in coverage penalty, however, may be pro-rated 26 based on the length of the gap in coverage as indicated in FIG. 6B.

In the event there is a penalty, the ACA requires that the penalty be the greater of a percentage of income, net of specified deductions, or a specified penalty that is applied per individual or family. For example, for the 2015 year, the percentage is 2.0 percent and increases to 2.5 percent in subsequent years. FIG. 6B illustrates the use of a subtraction function 28g' that utilizes the AGI node 24b to arrive at a taxable income value. A look-up function 28h is used to obtain the applicable tax rate (e.g., 2.0% for 2015) and is used to calculate the income-based ACA penalty 26.

In order to determine the non-income or "fixed" penalty, an accumulator function 28i is used to determine the penalty. In this example, the calculation pertains to a family wherein the penalty includes a fixed amount for a child ($162.50 per child in 2015) and a fixed amount per adult ($325.00 per adult). Under the ACA, there is a maximum cap of this fixed penalty. For example, in 2015, the maximum family penalty is $975. As seen in FIG. 6B, a cap function 28j is used to determine the minimum cap. Another function 28k that is referred to as "at least minimum cap" is used to determine the greater of the fixed penalty or the income-based penalty. If the income-based penalty is higher than the fixed amount then that value is used, otherwise the fixed penalty amount is used. Still referring to FIG. 6B, another cap function 28l is used to determine whether the penalty has exceeded another cap that is part of the ACA law. Under the ACA, the overall penalty is capped at the national average premium for a bronze level insurance plan. The cap function 28l is used to ensure that the calculated penalty (i.e., the income based penalty) does not exceed this amount. After application of the cap function 28l, the ACA penalty amount is determined.

As seen in FIG. 6B, there are a variety of different functions 28 that are employed as part of the process used to calculate any applicable penalty under the ACA. In some instances, a common function (e.g., cap functions 28j and 28l) is found in multiple locations within the tax calculation graph 14. It should be understood that the functions 28 illustrated in FIG. 6B are illustrative as other functions may be used beyond those specifically illustrated in the drawings.

Figure 6C:
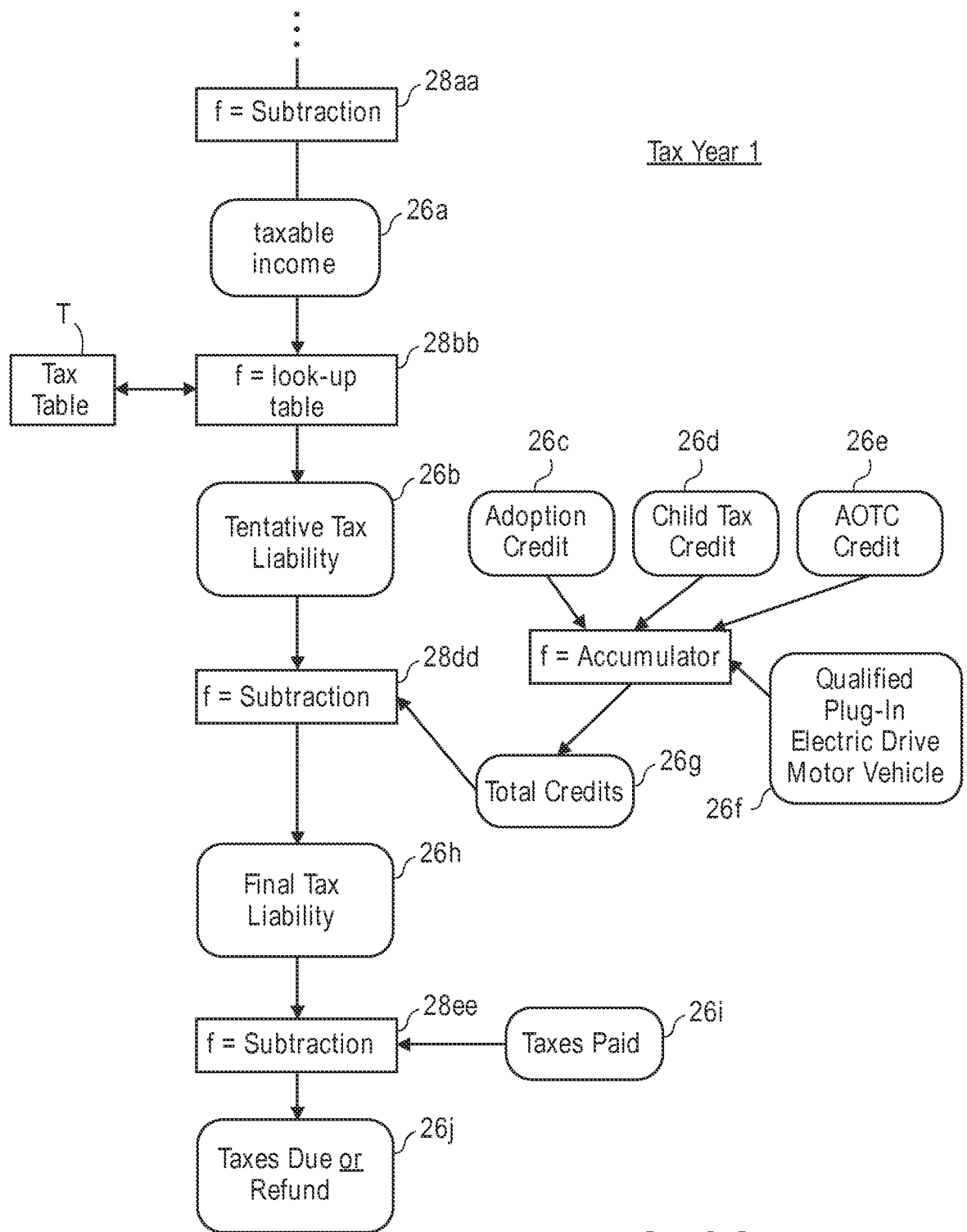
FIG. 6C illustrates an example of a portion of a tax calculation graph for Tax Year 1. The tax calculation graph illustrates how credits are applied to generate a taxes due or refund amount.

FIG. 6C illustrates a portion of a tax calculation graph 14a for a first taxable reporting period denoted as Tax Year 1. The illustrated portion of the tax calculation graph 14a includes a node 26a for taxable income. This node 26a may be populated, for example, using a preceding subtraction function 28aa. The taxable income data obtained from the taxable income node 26a is used by a look-up table function 28bb that uses a look up table T to determine a tentative tax liability that is stored in node 26b. In this particle example of the tax calculation graph 14a, various tax credits are illustrated such as the adoption credit, child tax credit, American Opportunity Tax Credit (AOTC), and the qualified plug-in electric drive motor vehicle credit. These various credits are contained in respective nodes 26c, 26d, 26e, 26f. It should be understood that this example is exemplary as there are other tax credits within the U.S. tax code that are not illustrated. Moreover, some of the tax credits phase-out based on income levels, for instance. Still other tax credits are so-called refundable tax credits (EITC) that may actually reduce a tentative tax liability to beyond zero to produce a refund owed to the taxpayer.

Still referring to FIG. 6C, an accumulator function 28cc is used to sum all of credit values from nodes 26c, 26d, 26e, 26f to determine the total tax credits, the value of which is stored in node 26g. Next, a subtraction function 28dd is used to subtract the total credits from node 26g from the tentative tax liability stored in node 26b. The result of this operation is to compute a final tax liability which is stored in node 26h. Another node 26i contains the value of taxes paid. For example, this value may include all of the taxes that have been withheld and paid as estimated taxes for Tax Year 1. A subtraction function 28ee is then used to subtract the value from the taxes paid node 26i from the final tax liability node 26h to generate a number that represents the amount of taxes that are due or, alternatively, the amount of refund that is owed to the taxpayer. This value is stored in node 26j.

Figure 6D:
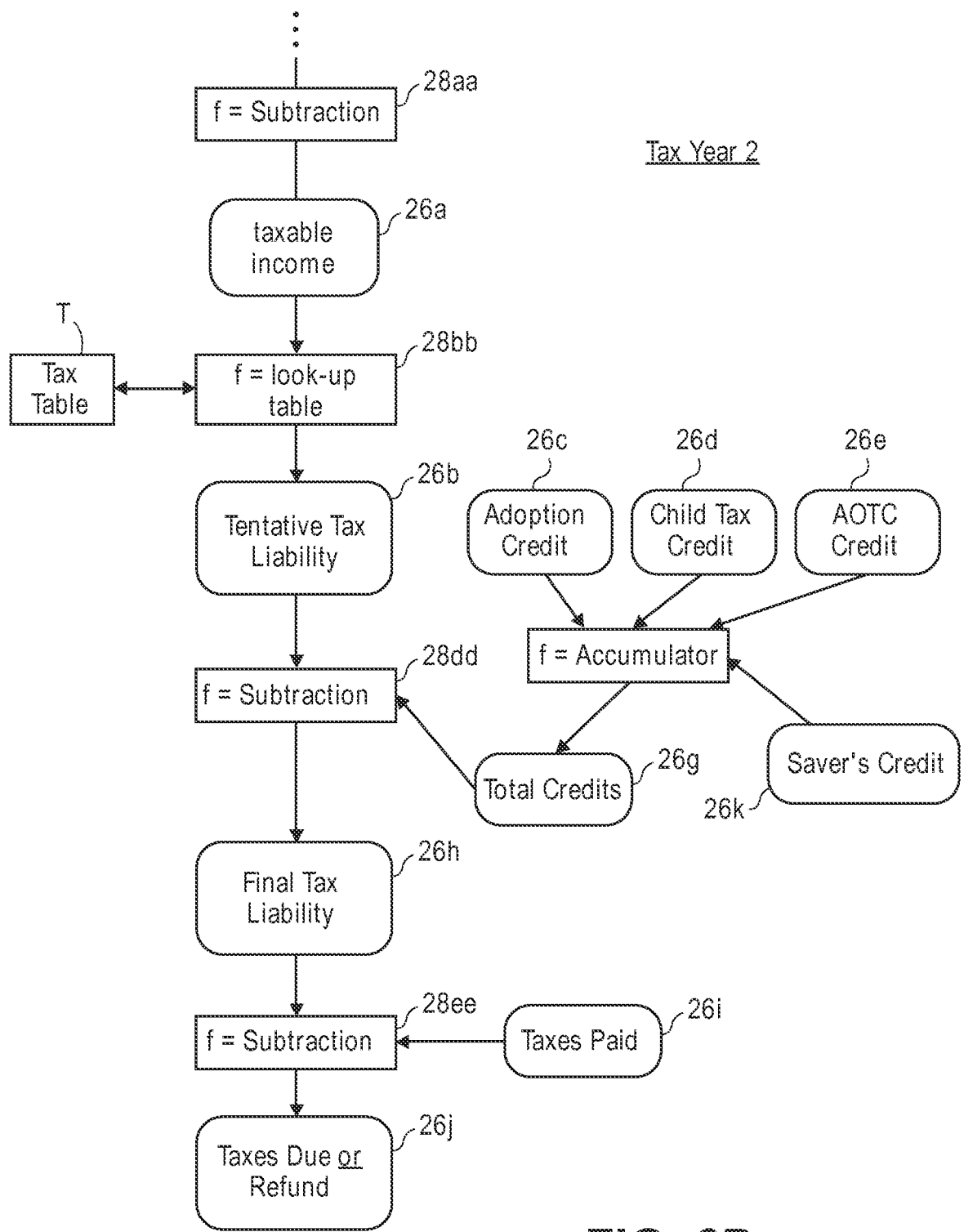
FIG. 6D illustrates an example of a portion of a tax calculation graph for Tax Year 2. The tax calculation graph illustrates how credits are applied to generate a taxes due or refund amount. In this example, the qualified plug-in electric drive motor vehicle tax credit no longer applies. In addition, in this example a new credit called the "saver's credit" now applies in Tax Year 2 that formerly did not exist.

FIG. 6D illustrates a version of a tax calculation graph 14β for a second taxable reporting period denoted as Tax Year 2. The tax calculation graph 14β is similar in many respects with the tax calculation graph 14a of FIG. 6C with several differences. As seen in FIG. 6D, the qualified plug-in electric drive motor vehicle tax credit as represented by node 26f in FIG. 6C is no longer present in the tax calculation graph 14β. This disappearance of this tax credit in Tax Year 2 may have been the result of a change in the tax code or perhaps the credit was scheduled to sunset in Tax Year 2. Similarly, as seen in FIG. 6D a new tax credit has appeared; the savers tax credit which is stored in node 26k. These changes are not uncommon occurrences as tax laws do change and evolve over time. In the context of tax calculation graphs 14a, 14β note how the larger structure of the tax calculation tree largely remains intact except for the addition or deletion of nodes 26k, 26f. Additional changes may occur beyond merely adding or removing nodes from the tax calculation graph when comparing different tax years.

Often, credits, deductions and the like change from year to year. For example, tax credits may be phased out or subject to other limitations. In such instances, the various functions in the tax calculation graphs 14a, 14β may be modified from year-to-year. As one example, the look-up table function 28bb in Tax Year 2 may be different from the look-up table function 28bb in Tax Year 1 because tax rates have changed. As another example, is the ACA penalty as was discussed in the context of FIG. 6B. ACA was designed to having increasing penalties for failure to have the required health insurance coverage. When comparing tax year 2014 with tax year 2015 these penalties increase. This increase can be reflected in updated look-up function 28h which reflects the increased penalty rate as compared to the prior year.

Figure 6E:
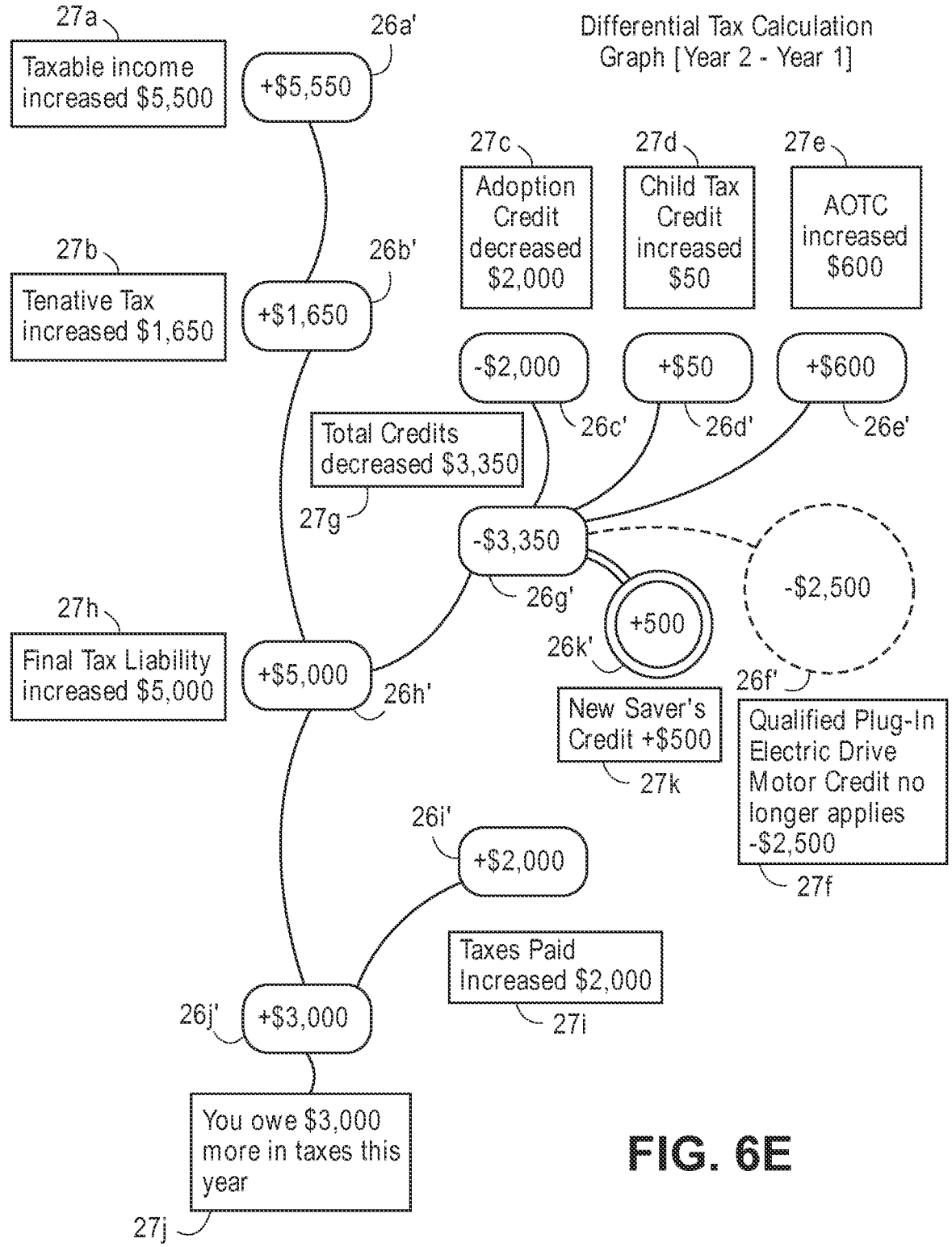
FIG. 6E illustrates a differential tax calculation graph that illustrates the numerical differences between the values contained within the common nodes of the two respective tax calculation graphs. Also illustrated are nodes reflective of the uncommon nodes, namely, those nodes that were either added or deleted in Tax Year 2.

FIG. 6E illustrates a differential tax calculation graph 15 that has a similar hierarchy as the tax calculation graphs 14a, 14β. Each node (26a', 26b', 26c', 26d', 26e', 26f', 26g', 26h', 26i', and 26j') contained with the differential tax calculation graph 15 contains a numeric value that corresponds to the numeric differences in value stored at that particular common node found in tax calculation graphs 14a, 14β. More particularly, the value contained within each node of the tax calculation graph 15 represents the value at the particular node from Tax Year 2—the value at the same particular node from Tax Year 1. The differential tax calculation graph 15 also includes nodes 26f' and 26k' for the deleted and added nodes, respectively. Thus, node 26f' shows a loss of $2,500 which represents the value of that same credit in Tax Year 1. Node 26k' illustrates the value of the saver's credit in Tax Year 2 since that credit was unavailable in Tax Year 2. Nodes 26f' and 26k' are uncommon nodes in that they are not shared within tax calculation graphs 14a, 14β.

Still referring to FIG. 6E, each node (26a', 26b', 26c', 26d', 26e', 26f', 26g', 26h', 26i', and 26j') is associated with a respective textual explanation that succinctly captures the difference in the particular node. For example, node 26a' includes an explanation 27a that "taxable income increased $5,550." Node 26b' includes an explanation 27b that "tentative tax increased $1,650." Node 26c' includes an explanation 27c that "adoption credit decreased $2,000." Node 26d' includes an explanation 27d that "child tax credit increased $50." Node 26e' includes an explanation 27e that "AOTC increased $600." Node 26f' includes an explanation 27f that "qualified plug-in electric drive motor credit no longer applies -$2,500" which represents the loss of this credit. Node 26k' includes an explanation 27k that "new saver's credit +$500" which represents the addition of this credit to Tax Year 2. Node 26g' includes an explanation 27g that "total credits decreased $3,350." Node 26h' includes an explanation 27h that "final tax liability increased $5,000." Node 26i' includes an explanation 27i that "taxes paid increased $2,000." Node 26j' includes an explanation 27j that "you owe $3,000 more in taxes this year."

The numerical value of each node 26a', 26b', 26c', 26d', 26e', 26f', 26g', 26h', 26i', and 26j' may be stored in a memory location that is mapped according the hierarchy of the differential tax calculation graph 15. In another embodiment, instead of a numerical value each node 26a', 26b', 26c', 26d', 26e', 26f', 26g', 26h', 26i', and 26j' may contain a percentage to indicate a percentage decrease or increase. In still another embodiment, the numerical value may be paired with the percentage decrease or increase. In addition, portions of the text for each explanation 27a, 27b, 27c, 27d, 27e, 27f, 27g, 27h, 27i, 27j, 27k may be stored within respective memory locations that are tied to particular nodes within the differential tax calculation graph 15. For example, pointers or the like may direct a specific explanation 27a, 27b, 27c, 27d, 27e, 27f, 27g, 27h, 27i, 27j, 27k to its corresponding node 26a', 26b', 26c', 26d', 26e', 26f', 26g', 26h', 26i', and 26j'. The particular wording of the explanation may change depending on the sign of the numerical value contained within the nodes. For example, positive values (+) may indicate that an amount has increased while a negative value (−) may indicate that an amount has decreased. Appropriate wording for the explanation 27a, 27b, 27c, 27d, 27e, 27f, 27g, 27h, 27i, 27j, 27k can then be generated.

In one aspect, all or a portion of the text for an explanation 27a, 27b, 27c, 27d, 27e, 27f, 27g, 27h, 27i, 27j, 27k may be pre-generated and stored for later retrieval. The explanations 27a, 27b, 27c, 27d, 27e, 27f, 27g, 27h, 27i, 27j, 27k may include aspects that change depending on the value contained in the nodes 26a', 26b', 26c', 26d', 26e', 26f', 26g', 26h', 26i', and 26j' of the differential tax calculation graph 15. For example, as noted above, positive values may be paired with the word "increased" while negative values may be paired with the word "decreased." Of course, these are just two examples and other pre-drafted templates may be used to generate the complete explanations 27a, 27b, 27c, 27d, 27e, 27f, 27g, 27h, 27i, 27j, 27k. In other embodiments, the explanations 27a, 27b, 27c, 27d, 27e, 27f, 27g, 27h, 27i, 27j, 27k may be generated in a natural language format using a natural language generator 114 (described herein in more detail).

Figure 7:
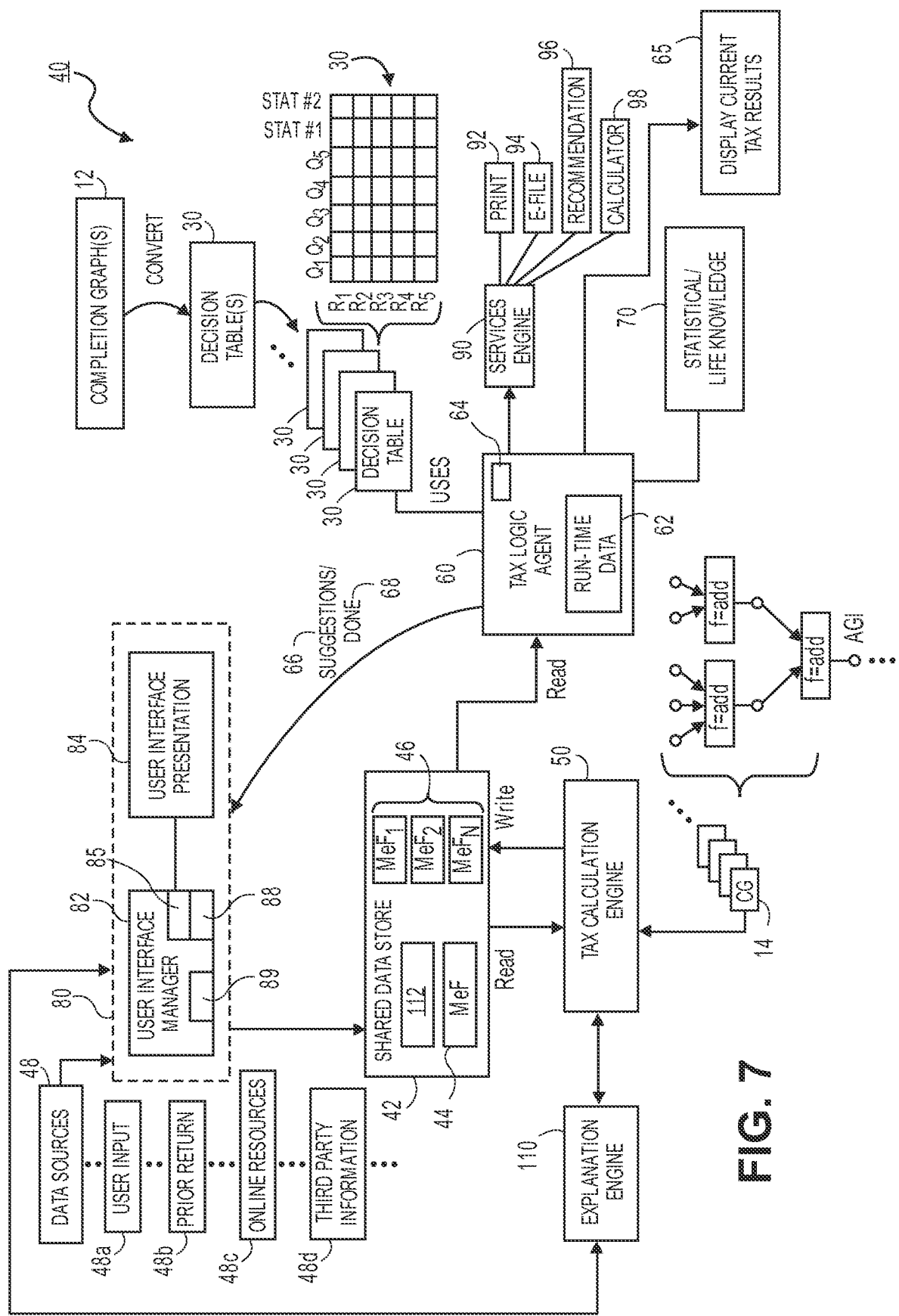
FIG. 7 schematically illustrates a system for calculating taxes using rules and calculations based on a declarative data structures according to one embodiment.

FIG. 7 schematically illustrates a system 40 for calculating taxes using rules and calculations based on a declarative data structures according to one embodiment. The system 40 include a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 13). The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version of the MeF model established by government authorities that utilizes additional fields. While the particular MeF schema 44 is discussed herein the invention is not so limited. There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 stored therein at any particular time. For example, FIG. 7 illustrates several instances 46 of the MeF schema 44 (labeled as $MeF_1$, $MeF_2$, $MeF_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

User input 48a is also one type of data source 48. User input 48a may take a number of different forms. For example, user input 48a may be generated by a user using, for example, a input device such as keyboard, mouse, touchscreen display, voice input (e.g., voice to text feature), photograph or image, or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48b to be searched but not online resources 48c. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question or prompt may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48a may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48b. A prior year tax return 48b that is stored electronically can be searched and data is copied and transferred to the shared data store 42. The prior year tax return 48b may be in a proprietary format (e.g., .txf, .pdf) or an open source format. The prior year tax return 48b may also be in a paper or hardcopy format that can be scanned or imaged whereby data is extracted and transferred to the shared data store 42. In another embodiment, a prior year tax return 48b may be obtained by accessing a government database (e.g., IRS records).

An additional example of a data source 48 is an online resource 48c. An online resource 48c may include, for example, websites for the taxpayer(s) that contain tax-related information. For example, financial service providers such as banks, credit unions, brokerages, investment advisors typically provide online access for their customers to view holdings, balances, transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?"). Additional follow-up questions can then be presented to the user.

Still referring to FIG. 7, another data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48d include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

Referring briefly to FIG. 13, the tax preparation software 100 including the system 40 of FIG. 7 is executed by the computing device 102, 103. Referring back to FIG. 7, the tax preparation software 100 includes a tax calculation engine 50 that performs one or more tax calculations or tax operations based on the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A-6E. In one embodiment, a series of different calculation graphs 14 are used for respective tax topics. These different calculation graphs 14 may be glued together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form a Drools expert engine. Other declarative rules engines 64 may be utilized and a Drools expert rule engine 64 is provided as one example of how embodiments may be implemented. The TLA 60 may be implemented as a dedicated module contained within or executed in connection with the tax preparation software 100.

As seen in FIG. 7, The TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, which, as explained in more detail below presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing of compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher. Predictive modeling based on statistical data 36 using any suitable data such as previously filed tax returns, demographic information, financial information and the like may be used as part of this ranking process.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097,057 previously incorporated herein by reference, data such as required inputs can be stored to a fact cache so that the needed inputs can be recalled at a later time, and to determine what is already known about variables, factors or requirements of various rules.:

Rule engine (64)/Tax Logic Agent (TLA) (60)
    //initialization process
    Load_Tax_Knowledge_Base;
    Create_Fact_Cache; While (new_data_from_application)
      Insert_data_into_fact_cache;
        collection=Execute_Tax_Rules; //collection is all the
          fired rules and corresponding conditions
        suggestions=Generate_suggestions (collection);
        send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(*b*) retirement accounts. This information may then be used by the TLA 60 when generating its suggestions 66. For example, rather than asking generically about retirement accounts, the suggestion 66 can be tailored directly to a question about 403(*b*) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 may manifest itself, typically, on a visual screen or display 104 that is presented on a computing device 102, 103 (seen, for example, in FIG. 13). The computing device 102 may include the display of a computer, laptop, tablet, mobile phone (e.g., Smartphone), or the like. Different user interface presentations 84 may be invoked using a UI generator 85 depending, for example, on the type of display 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, is responsible for resolving of how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may be pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on-the-fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device 102, 103. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be request of the taxpayer. For example, with regard to donated goods, the taxpayer may be prompted to explain what the donated good are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, different discrete topics such as Adjusted Gross Income or Taxable Income may be illustrated. Deductions (either itemized or standard) may be listed along with personal exemptions. Penalties or tax credits may also be displayed on the computing device 102, 103. This information may be displayed contemporaneously with other information, such as user input information, or user interview questions or prompts or even narrative explanations 116 as explained herein.

The TLA 60 also outputs a tax data that is used to generate the actual tax return (either electronic return or paper return). The return itself can be prepared by the TLA 60 or at the direction of the TLA 60 using, for example, the services engine 60 that is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, the year-over-year calculation graphs 14 can be used to readily identify differences and report the same to a user. Calculation graphs 14 from non-continuous years may also be compared in the same manner. In addition, the tax calculation graph 14 may include a tax calculation that reflects the calculation of taxes according the laws and regulations that will be in effect in a future time period. For example, many times, it is known well in advance about certain tax law changes that have been enacted but will not go into effect until some future date. Tax calculation graphs for such a future state can be developed and utilized by the taxpayer to engage in tax planning. For example, it may be preferable to defer certain tax impacting events until a later date when lax legislation is more favorable. Conversely, such future tax calculation graphs may be used to recommend accelerating certain activities into a current tax year to gain a tax benefit (e.g., in the context of FIG. 6E, utilizing the qualified plug-in electric drive motor credit in a year in which the full credit applies). Differences can be found using commonly used graph isomorphism algorithms over the two respective calculation graphs 14 to automatically generate the differential tax calculation graph 15. Topological differences between the nodes or sub-nodes within the respective tax calculation graphs 14 can be identified automatically by systematically traversing each node or sub-node in a recursive manner.

Referring to FIG. 7, the system includes an explanation engine 110 that operates in connection with the tax preparation software 100 to generate a narrative explanation from the one or more explanations associated with a particular tax operation 29 and associated node 26, 26a', 26b', 26c', 26d', 26e', 26f', 26g', 26h', 26i', and 26j' (illustrated in FIGS. 6A-6E). To generate the narrative explanation for a node 26, 26a', 26b', 26c', 26d', 26e', 26f', 26g', 26h', 26i', and 26j' and the associated tax operation 29, the explanation engine 110 extracts the particular narrative associated with the node 26, 26a', 26b', 26c', 26d', 26e', 26f', 26g', 26h', 26i', and 26j' or tax operation 29. For example, a "cap" function and associated node may be associated with an explanation of "value exceeds cap." This brief explanation can be combined with a stored explanation or narrative that is associated with the particular functional node 26, 26a', 26b', 26c', 26d', 26e', 26f', 26g', 26h', 26i', and 26j' within the tax calculation graph 14. For example, the functional node 26 paired with the stored "cap" function 28 gives a contextual tax explanation in that is more than merely "value exceeds cap." For instance, a pre-stored narrative associated with the particular functional node 26 having to do with the child tax credit within the calculation graph 14 may be a complete statement or sentence such as "You cannot claim a child tax credit because your income is too high." In other embodiments, the pre-stored narrative may be only a few words or a sentence fragment. In the above example, the pre-stored narrative may be "credit subject to income phase out" or "AGI too high." The narrative may also explain how this particular topic or sub-topic changes over different tax reporting periods as explained in the context of FIGS. 6C-6E. For example, the narrative may include "your child tax credit is $200 smaller than last year." A particular functional node 26 and associated function 28 may have multiple pre-stored narratives. The particular narrative(s) that is/are associated with a particular functional node 26 and associated function 28 may be stored in entries 112 in a memory, data store or database such as data store 42 of FIG. 7. For example, with reference to FIG. 7, data store 42 contains the pre-stored narratives that may be mapped, pointed to, or otherwise tagged to particular functional nodes 26 and associated functions 28 contained within the calculation graph(s) 14. The locations or addresses of the various functional nodes 26 and the associated functions 28 can be obtained using the calculation graphs 14.

Figure 8A:
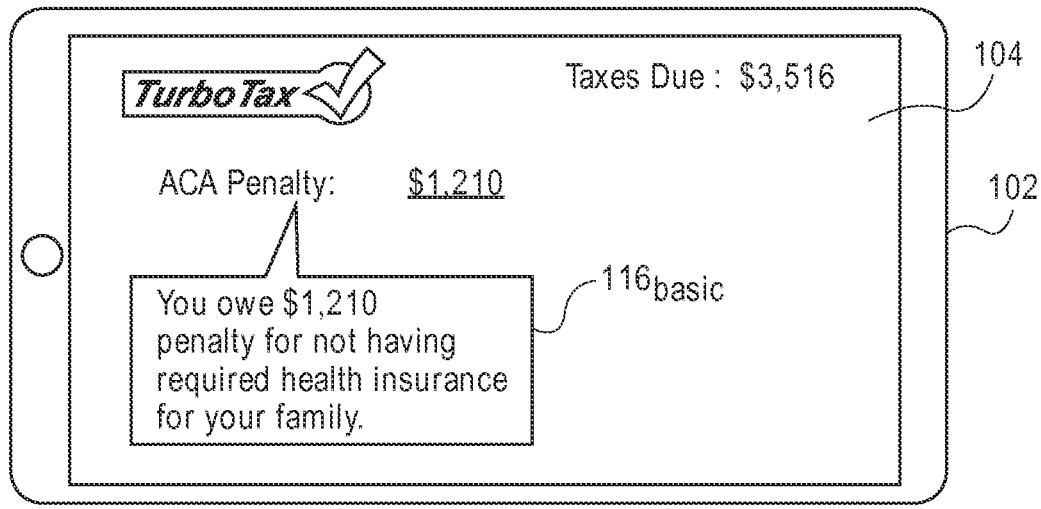
FIG. 8A illustrates a display of a computing device illustrating a narrative explanation according to one embodiment.
Figure 8B:
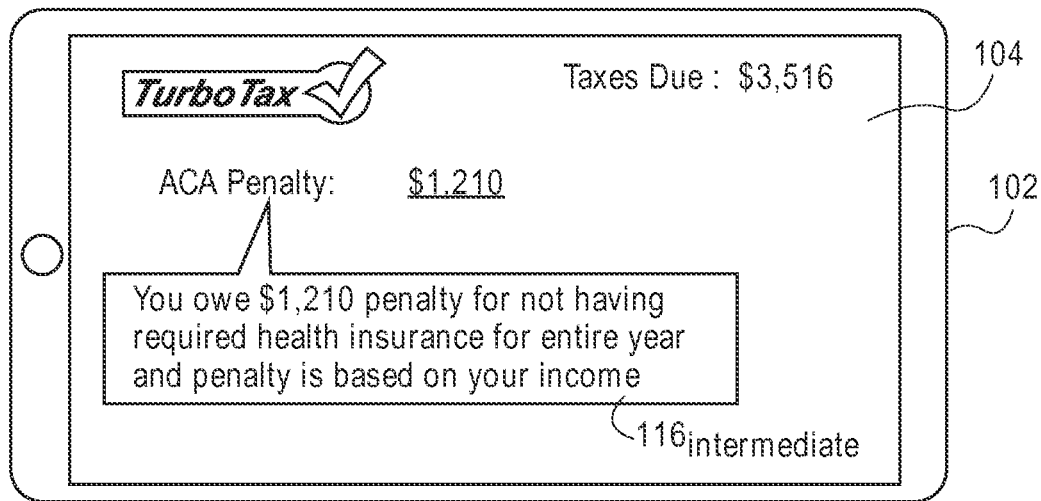
FIG. 8B illustrates a display of a computing device illustrating a narrative explanation according to another embodiment.
Figure 8C:
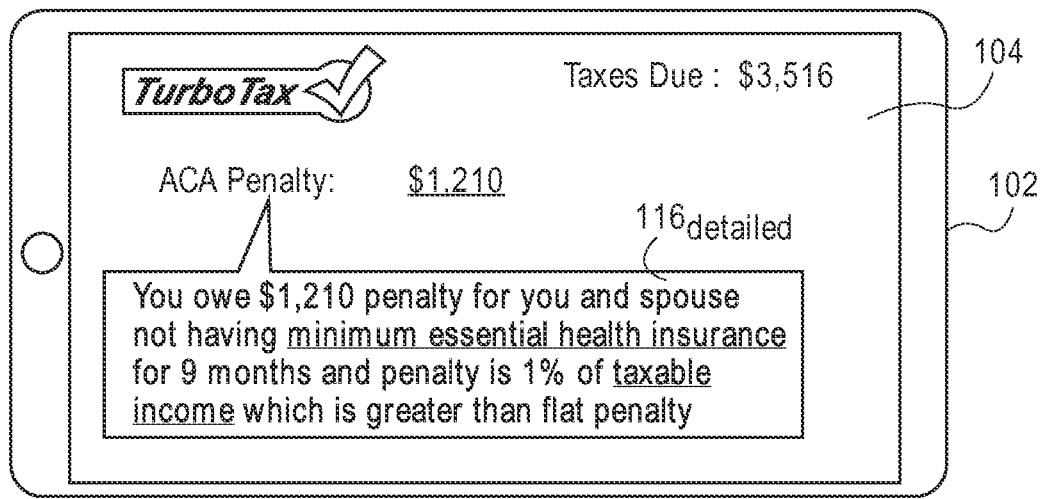
FIG. 8C illustrates a display of a computing device illustrating a narrative explanation according to another embodiment.

These stored entries 112 can be recalled or extracted by the explanation engine 110 and then displayed to a user on a display 104 of a computing device 102, 103. For example, explanation engine 110 may interface with the UI control 80 in two-way communication such that a user may be ask the tax preparation software 100 why a particular tax calculation, operation, or decision has been made by the system 40. For instance, the user may be presented with an on-screen link (FIGS. 10A, 10B, 11A, 11B, 12A, and 12B illustrate a hyperlink 120), button, or the like that can be selected by the user to explain to the user why a particular tax calculation, operation, or decision was made by the tax preparation software 100. For example, in the context of FIG. 6B described herein, a user may see an ACA penalty of $1,210.00 listed on the screen of the computing device 102, 103 while he or she is preparing the tax return for a prior year. FIGS. 8A-8C illustrate an example of such a screen shot. The taxpayer may be interested in why there such a penalty. As one example, the initial explanation provided to the user may be "you have an ACA penalty because you, your spouse, and your two child dependents did not have coverage during the 2014 calendar year and the penalty is based on your income." This explanation may be associated with, for example, function node 26 and function 28 pair B in FIG. 6B. In some instances, a user is able to further "drill down" with additional questions to gain additional explanatory detail. This additional level of detailed explanations is possible by retracing the calculation graph(s) 14 to identify a predecessor or upstream function node 26 and function 28. In the context of the example listed above, a user may not be satisfied and may want additional explanation. In this instance, for example, the word "income" may be highlighted or linked with a hyperlink. A user clicking on this would then be provided with additional explanation on the detail regarding the ACA penalty. In this example, the user may be provided with "Under the ACA your penalty is the greater of 1% of your taxable income or a fixed dollar amount based on your family circumstances. In your situation, the 1% of taxable income exceeded the fixed dollar amount." This particular explanation may be associated with the predecessor function node 26 and function 28 pair A in FIG. 6B. Additional details may be provided by further retracing, in a backwards fashion, the calculation graph 14.

With reference to FIG. 7, the explanation engine 110 may also automatically generate explanations that are then communicated to the user interface manager 80. The automatically generated explanations may be displayed on a display associated with the computing devices 102, 103. In some embodiments, the explanations may be contemporaneously displayed alongside other tax data and/or calculations. For example, as a user inputs his or her information into the tax preparation software 100 and calculations are automatically updated, explanations maybe automatically displayed to the user. These explanations maybe displayed in a side bar, window, panel, pop-up (e.g., mouse over), or the like that can be followed by the user. The explanations may also be fully or partially hidden from the user which can be selectively turned on or off as requested by the user.

In one aspect of the invention, the choice of what particular explanation will be displayed to a user may vary. For example, different explanations associated with the same function node 26 and function 28 pair may be selected by the explanation engine 110 for display to a user based on the user's experience level. A basic user may be given a general or summary explanation while a user with more sophistication may be given a more detailed explanation. A professional user such as a CPA or other tax specialist may be given even more detailed explanations. FIGS. 8A-8C illustrates three different explanations ($116_{basic}$, $116_{intermediate}$, $116_{detailed}$) that are displayed to different users that have various degrees of explanation. FIG. 8A illustrates a basic explanation $116_{basic}$. In this example, an explanation is provided by the taxpayer that owes an ACA penalty of $1,210. FIG. 8B illustrates a more detailed explanation $116_{intermediate}$ of this same penalty. In the FIG. 8B example, the taxpayer is told additional reasons behind the penalty (i.e., required health insurance was not obtained for the entire tax year). In FIG. 8C, an even more detailed explanation $116_{detailed}$ is given which more closely tracks the actual function node 26 and function 28 that makes up the calculation graph 14. Note that in FIG. 8C various terms such as "minimum essential health insurance" which has a specific definition under U.S. tax code and regulations is linked so that the user can drill into even more detail. Likewise, taxable income is linked in this example, letting the user potentially drill even further into the calculation of the ACA penalty. While three such explanations 116 are illustrated in the context of FIGS. 8A-8C, additional levels of simplicity/complexity for the explanation can be used.

In some embodiments, the different levels of explanation may be tied to product types or codes. These may be associated with, for example, SKU product codes. For example, a free edition of the tax preparation software 100 may little or no explanations. In a more advanced edition (e.g., "Deluxe Edition" or "Home and Business Edition"), additional explanation is provided. Still more explanation may be provided in the more advanced editions of the tax preparation software 100 (e.g., "Premier edition"). Version of the tax preparation software 100 that are developed for accountants and CPAs may provide even more explanation.

In still other embodiments a user may be able to "unlock" additional or more detailed explanations by upgrading to a higher edition of tax preparation software 100. Alternatively, a user may unlock additional or more detailed explanations in an a la carte manner for payment of an additional fee. Such a fee can be paid through the tax preparation software 100 itself using known methods of payment.

Figure 9:
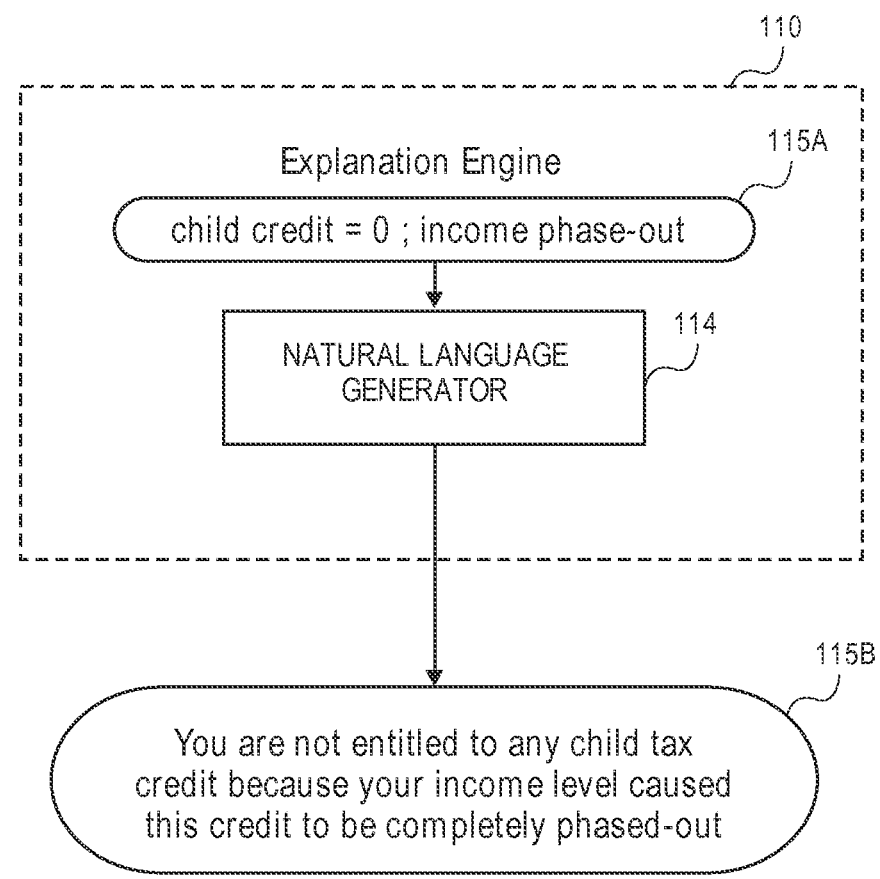
FIG. 9 illustrates an explanation engine that is part of the system for calculating taxes according to one embodiment. The explanation engine generates narrative explanations that can be displayed or otherwise presented to users to explain one or more tax calculations or operations that are performed by the tax preparation software.

FIG. 9 illustrates additional details of the explanation engine 110 according to an embodiment of the invention. In this embodiment, the explanation engine 110 includes a natural language generator 114 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 26 and associated function 28. In the example of FIG. 9, a brief explanation 115A extracted by the explanation engine 110 which indicates that the child credit tax is zero due to phase out from income level is then subject to post-processing to convert the same into a more understandable sentence that can be presented to the user. In this example, the user is provided with a natural language explanation 115B that is more readily understood by users.

In one aspect of the invention, the natural language generator 114 may rely on artificial intelligence or machine learning such that results may be improved. For example, the explanation engine 110 may be triggered in response to a query that a user has typed into a free-form search box within the tax preparation software 100. The search that has been input within the search box can then be processed by the explanation engine 110 to determine what tax operation the user is inquiring about and then generate an explanatory response 115B.

Figure 10A:
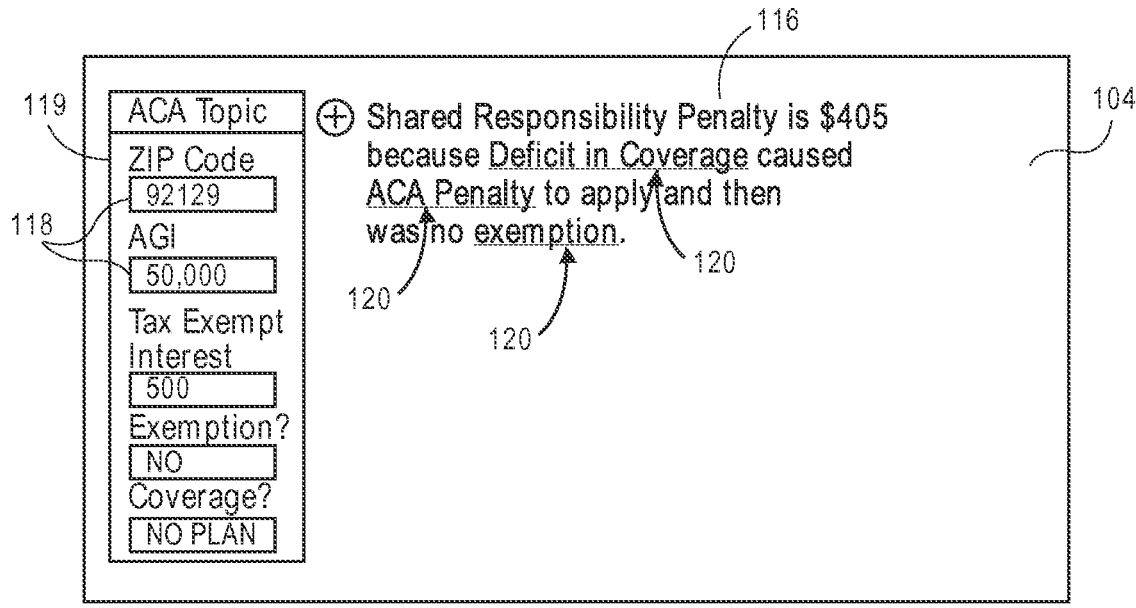
FIGS. 10A and 10B illustrate a display of a computing device along with a narrative explanation that was generated by the explanation engine according to one embodiment. The narrative explanation contains multiple phrases that are linked that can be selected to provide additional detailed explanations.
Figure 10B:
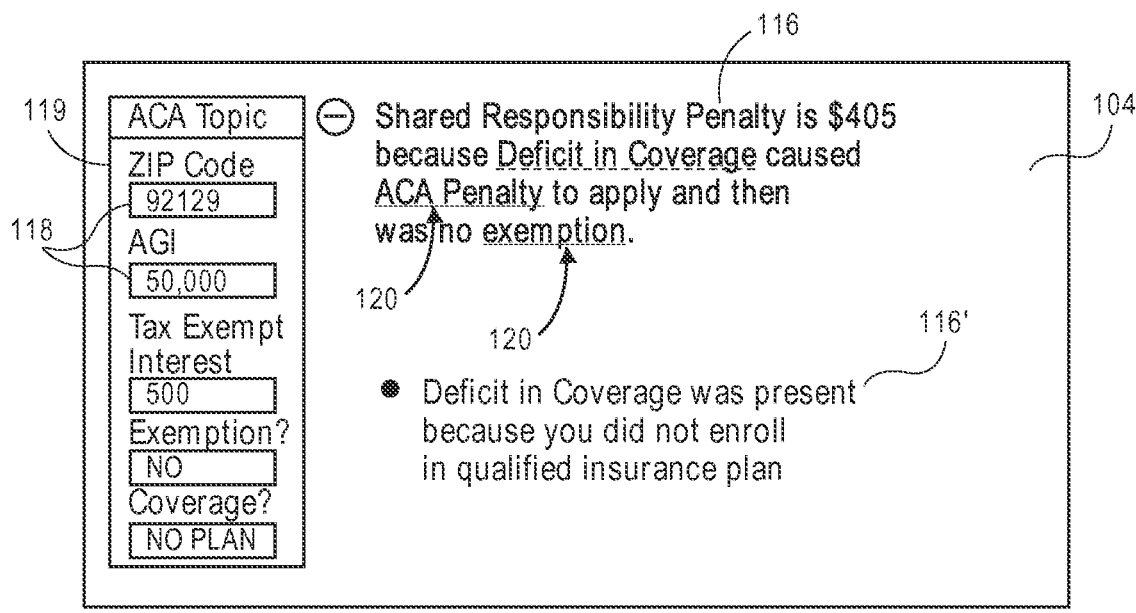

FIGS. 10A, 10B, 11A, 11B, 12A, and 12B illustrate various embodiments of how a narrative explanation 116 may be displayed to a user on a display 104 that is associated with a computing device 102, 103. FIGS. 10A and 10B illustrate an exemplary screen shot of a display 104 that contains a narrative explanation 116 of a tax operation. In this particular example, the tax operation pertains to the ACA shared responsibility penalty. As seen in the screen shot on display 104, the narrative explanation 116 may be presented along with additional tax data 118 that generally relates to the specific tax operation. In this example, a separate window 119 contains tax data 118 that relates to the tax operation or topic that is germane to the narrative explanation 116 that is being displayed. In this example, the taxpayer's zip code, AGI, tax exempt interest amount, exemption status, and insurance coverage status are illustrated. It should be understood, however, that the specific tax data 118 that is displayed may vary and many include more or less information. In addition, the tax data 118 may be hidden from view in other embodiments. Likewise, the tax data 118 does not have to be displayed in a separate window 119 or other area on the display 104. For example, the tax data 118 could be on a ribbon or pop-up window.

As seen in FIG. 10A, the narrative explanation 116 includes a plurality of words wherein several words or phrases are hyperlinked 120. In this regard, the narrative explanation 116 is nested as one or more phrases can be further expanded as is illustrated below. In this example, the narrative explanation 116 tells the user why their shared responsibility penalty was $405. Specifically, the narrative explanation 116 explains that the shared responsibility penalty is $405 because there was a deficit in coverage that causes the ACA penalty to apply and there was not exemption. The narrative explanation 116 in this example includes three phrases or words ("deficit in coverage"; "ACA Penalty"; "exemption") that are hyperlinked 120. A user can select a hyperlink 120 associated with one of these phrases or words where an additional narrative explanation 116' is given as illustrated in FIG. 10B. FIG. 10B illustrates a view of the display 104 after a user has selected the "deficit in coverage" phrase in FIG. 10A. As seen in FIG. 10B, the user is presented with another narrative explanation 116' explaining additional details on why there was a deficit in coverage for the taxpayer. Here, the user is told that a deficit in coverage was present because the taxpayer did not enroll in a qualified insurance plan during the year. As seen in FIG. 10B, the hyperlink 120 for "deficit in coverage" may change appearances upon being selected. For example, the hyperlink 120 may go from a solid line to a dashed line to indicate that it has been selected. Of course, other changes in appearance such as size, shape, highlighting can be used. Alternatively, the word or phrase of the hyperlink 120 may change appearances after being selected. For example, the word or phrase may change color, font size, or be highlighted to illustrate that the additional explanation 116' pertains to that specific word or phrase.

FIGS. 11A and 11B illustrate how the initial narrative explanation 116 can be expanded further a plurality of times. In this example, the initial narrative explanation 116 includes the phrase "ACA Penalty." A user may select the hyperlink 120 associated with this phrase that brings up another narrative explanation 116a that provides additional explanatory detail on the ACA penalty. In this example, the additional narrative explanation 116a itself includes several words or phrases with hyperlinks 120. In this example, "calculated ACA penalty," "minimum penalty," and "maximum penalty" are phrases that contain respective hyperlinks 120 where even additional explanation can be found. As seen in FIG. 11B, for example, a user that selects the hyperlink 120 that is associated with "calculated ACA penalty" returns another narrative explanation 116b that explains how the amount of the calculated ACA penalty was derived. In this example, the penalty was calculated as 1% of taxable income.

FIGS. 12A and 12B illustrate the same initial narrative explanation 116 as found in FIGS. 10A and 11A but with the hyperlinks 120 associated with the word "exemption" being selected. As seen in FIG. 12A, in narrative explanation 116d, the user is given an explanation that no exemption applies because the taxpayer did not quality for any specified exemptions including the affordability exemption because the lowest cost plan, itself a defined phrase that has a hyperlink), is less than 8% of household income. FIG. 12B illustrates the same display 104 after a user has selected the hyperlink 120 that is associated with "lowest cost plan" which then displays that the lowest cost plan offered by the State in which the taxpayer resides is $250/month.

The narrative explanations 116 and their associated sub-explanations (e.g., 116', 116a, 116b, 116d, 116e) are constructed as an explanation tree with the root of the tree representing a particular tax topic or tax operation. In the example of FIGS. 10A, 10B, 11A, 11B, 12A, and 12B, the tax topic pertains to the ACA penalty. The explanation trees are readily constructed based on the function nodes 26 and associated functions 28 contained within the calculation graph 14. For example, one is able to "drill down" into more detailed explanations by walking up the directed graph that forms the calculation graph 14. For example, the initial explanation 116 that is displayed on the screen may be associated with node D of the calculation graph 14 of FIG. 6B. By selecting the ACA penalty hyperlink 120 as seen in FIGS. 11A and 11B, a predecessor node (e.g., node C) is used to generate the narrative explanation 116a. Yet another predecessor node (node A) is used to generate the narrative explanation of the calculated ACA penalty. In this manner, explanations can be presented to the user in a recursive manner by reversely traversing the calculation graph 14. Conversely, walking progressively down the calculation graph 14 shows how one node 26 affects other downstream nodes 26.

FIG. 12C illustrates another embodiment of the invention, whereby explanations are given to the user of why he or she owes $5,000 more in taxes in Tax Year 2 as opposed to Tax Year 1. In this example, Tax Year 2 may be the current year while Tax Year 1 may be the immediately preceding tax year (although it could be another year). In this example, the user is presented with an explanation that her final tax liability is $5,000 larger than last year. In addition, the user is presented with several additional explanations of the main contributors to the larger tax liability. In this example, the user is presented with several explanations including the explanation 27a that "taxable income increased $5,500" as compared to last year. In addition, the user is shown in explanation 27f that the "qualified plug-in electric drive motor credit no longer applies." Another large contributor is also displayed on the display 104 that says the "adoption credit decreased $2,000" as compared from last year. In this particular example, only the top contributors are initially illustrated. In other embodiments, the user may be shown all of the contributors. In FIG. 12C the user is given the option to see additional detail by selecting the "more" hyperlink. In one aspect of the invention, the explanations are displayed to the user with a ranking system with the largest contributors promoted to a more prominent or higher position on the display 104 (e.g., ranked #1, #2, #3).

Note that the invention may also work with partial tax data for the current year and does not necessarily require that the current year tax data be complete. For example, explanations may be provided to the user during the interview or data capture process with explanations reflected the then-current state of data for Tax Year 2 (e.g., current tax year). In this regard, explanations may be provided to the user in real time or near real time as data is input by the user as part of the interview process or is automatically captured and stored within, for example, data store 42. Likewise, the invention will also work on completed tax data for the current year which will provide the most accurate explanations for differences in the refund amount or taxes due over different tax reporting periods.

Note that in this example, portions of the explanations 27a, 27c may include hyperlinked text or amounts that can be selected by the user to provide additional information. For example, the user may want additional detail how her taxable income increased $5,500 from the prior year. By selecting this link the user will be provided with another display that illustrates explanations showing the main contributors to the increased taxable income. Similarly, in this example, explanation 27c includes a link to the $2,000 figure that represents the decrease in the adoption credit. Clicking on this link will provide the user with one or more reasons why the adoption credit decreased from the prior art. In this regard, the user is able to selectively drill down for additional details into his or her taxes.

FIG. 12D illustrates another embodiment of the invention, whereby explanations are given to the user about changes to his or her taxes based on changes in tax laws or regulations between a current year and a future year. In this example, the same inputs are used to analyze tax differences between a current year and a future tax year. Again, a differential tax calculation graph or tree similar to that illustrated in FIG. 6E is used. In this particular example, the user is provided with reason 27m that explains that assuming no changes to tax inputs (e.g., wages, deductions, etc.) his taxes will increase by $1,750. Also displayed on the display 104 is a listing of ranked reasons for the increase in tax liability. Reason 27n is presented which explains that the taxpayer's itemized deductions will phase-out next year. Reason 27o is also provided that explains that the taxpayer's child will be too old to be claimed as a dependent.

The tax calculation graphs (e.g., 14α, 14β in the context of FIGS. 6C and 6D) can be traversed recursively to identify those places where differences are noted. The differences may include an added node 26, a deleted node 26, or a change in the function 28 that is applied as part of the tax operation that is performed to generate the data with will be stored in the particular node 26. In one aspect of the invention, this operation takes place when the differential tax calculation graph 15 is generated.

By encapsulating the tax code and regulations within calculation graphs 14 results in much improved testability and maintainability of the tax preparation software 100. Software bugs can be identified more easily when the calculation graphs 14 are used because such bugs can be traced more easily. In addition, updates to the calculation graphs 14 can be readily performed when tax code or regulations change with less effort.

Further, the degree of granularity in the explanations 27, 116 that are presented to the user can be controlled. As explained in the context of FIGS. 8A-8C different levels of details can be presented to the user. This can be used to tailor the tax preparation software 100 to provide scalable and personalized tax explanations to the user. The narrative explanations 116 can be quickly altered and updated as needed as well given that they are associated with the calculation graphs and are not hard coded throughout the underlying software code for the tax preparation software 100.

Note that one can traverse the calculation graphs 14 in any topologically sorted order. This includes starting at a leaf or other input node and working forward through the calculation graph 14. Alternatively, one can start at the final or terminal node and work backwards (e.g., recursively). One can also start at in intermediate node and traverse through the directed graph in any order. By capturing the tax code and tax regulations in the calculation graph, targeted calculations can be done on various tax concepts, tax topics, or sub-topics. For example, FIG. 6B demonstrates a very isolated example of this where a calculation graph 14 is used to determine the amount, if any, of the ACA shared responsibility penalty. Of course, there are many such calculation graphs 14 for the various topics or sub-topics that makeup the tax code. This has the added benefit that various tax concepts or topics can be isolated and examined separately in detail and can be used to explain intermediate operations and calculations that are used to generate a final tax liability or refund amount. For example, custom-created tax calculators on various tax aspects can be generated (e.g., income, deductions, credits, exemptions, and the like).

A user initiates the tax preparation software 100 on a computing device 102, 103 as seen, for example, in FIG. 13. The tax preparation software 100 may reside on the actual computing device 102 that the user interfaces with or, alternatively, the tax preparation software 100 may reside on a remote computing device 103 such as a server or the like as illustrated. In such an instances, the computing device 102 that is utilized by the user or tax payer communicates via the remote computing device 103 using an application 105 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

A user initiating the tax preparation software 100, as explained herein may import tax related information form one or more data sources 48. Tax data may also be input manually with user input 48a. The tax calculation engine 50 computes one or more tax calculations dynamically based on the then available data at any given instance within the schema 44 in the shared data store 42. In some instances, estimates or educated guesses may be made for missing data. Details regarding how such estimates or educated guesses are done maybe found in U.S. patent application Ser. No. 14/448,986 which is incorporated by reference as if set forth fully herein. As the tax preparation software 100 is calculating or otherwise performing tax operations, the explanation engine 110 is executing or made available to execute and provide to the user one or more narrative explanations regarding calculations or operations being performed as referenced by particular functional nodes 26 and functions 28 contained within the calculation graph 14. As noted herein, in some instances, the narrative explanations are provided automatically to the UI control 80. In other instances, explanations are provided by the explanation engine 110 upon request of a user. For example, a user may request explanations on an as-needed basis by interfacing with the tax preparation software 100.

FIG. 14 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 14 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computing system, comprising:
a computing device comprising a computer processor, a memory and a display;
a computerized tax return preparation application comprising computer executable instructions stored in the memory and executable by the processor, the computerized tax return preparation application being operable to generate an electronic tax return and comprising:
a shared data store configured to store runtime data of the electronic tax return and a plurality of narratives associated with a first reporting period and a plurality of narratives associated with a second reporting period,
an interface controller in communication with the shared data store,
a first calculation graph structure for the first reporting period, the first calculation graph structure comprising a plurality of nodes including a plurality of leaf or input nodes, a plurality of functional nodes and associated respective functions, wherein respective calculation paths through the first calculation graph structure connect a plurality of data dependent nodes of the first calculation graph structure,
a second calculation graph structure for the second reporting period, the second calculation graph structure comprising a plurality of nodes including one or more of leaf or input nodes, functional nodes and associated respective functions, and a plurality of calculation paths, each calculation path connecting a plurality of data dependent nodes of the second calculation graph structure, wherein the associated respective functions of the first calculation graph structure and the second calculation graph structure comprise functions in common with the tax preparation application such that changes in tax laws and/or regulations may be implemented by changing one or more of the associated respective functions,
a calculation engine in communication with the shared data store and configured to receive the first calculation graph structure and the second calculation graph structure as inputs and identify differences among nodes of the first calculation graph structure and nodes of the second calculation graph structure, the calculation engine being configured to generate a differential tax calculation graph structure comprising a hierarchical structure based at least in part upon the first calculation graph structure and the second calculation graph structure and indicating differences among nodes of the first calculation graph structure and nodes of the second calculation graph structure,
an explanation engine in communication with the calculation engine, the user interface controller and the shared data store and configured to identify a pointer or tag associated with at least one functional node and associated function, identify a narrative in the shared data store based at least in part upon the pointer or tag, and generate a textual explanation for the one or more differences among the nodes regarding a change in tax liability in the first reporting period compared to the second reporting period based at least in part upon the identified narrative,
the interface controller configured to receive the textual explanation and generate a user interface comprising the textual explanation that is presented through the display of the computing device, wherein different user interface presentations are invoked based on a type of the display used by the computing device; and a rule-based logic agent in communication with the shared data store, the rule-based logic agent being further configured to receive first runtime data from the shared data store, determine which questions of the computerized tax return preparation application that remain unanswered based at least in part upon the first runtime data and a completion graph data structure, generate a non-binding suggestion based at least in part upon the determined questions, and transmit the non-binding suggestion to the interface controller, the interface controller receiving the non-binding suggestion from the rule-based logic agent and presenting a question based on the non-binding suggestion to the user interface, tax logic determinations being executed independently of and before the interface controller receives the non-binding suggestion.

2. The computing system of claim 1, wherein the second tax calculation graph structure differs from the first calculation graph structure based on an addition of one or more additional interconnecting functional nodes.

3. The computing system of claim 2, wherein the explanation engine is further configured to generate the textual explanation of one or more differences as based at least in part upon the one or more additional interconnecting functional nodes.

4. The computing system of claim 1, wherein the second tax calculation graph structure differs from the first calculation graph structure based on a deletion of one or more additional interconnecting functional nodes.

5. The computing system of claim 4, wherein the explanation engine is further configured to generate the textual explanation of one or more differences based at least in part upon the one or more deleted interconnecting functional nodes.

6. The computing system of claim 1, wherein the second tax calculation graph structure differs from the first calculation graph structure based on different functions connecting similar nodes.

7. The computing system of claim 1, wherein the first tax reporting period comprises a current tax year and the second tax reporting period comprises an immediately preceding tax year.

8. The computing system of claim 7, wherein the first tax calculation graph structure comprises estimates for the current tax year.

9. The computing system of claim 1, wherein the first tax reporting period comprises a future tax year and the second tax reporting period comprises a current or past tax year.

10. The computing system of claim 9, the first tax calculation graph structure comprising data copied from data contained within the second tax calculation graph structure for the current or past tax year.

11. The computing system of claim 1, the first tax calculation graph structure comprising data manually entered by the user.

12. The computing system of claim 1, wherein the first tax calculation graph structure and the second tax calculation graph structure each comprises respective subgraphs of larger corresponding tax calculation graph structures.

13. The computing system of claim 12, each node of the first tax calculation graph structure and the second tax calculation graph structure comprising a common tax concept.

14. The computing system of claim 1, the textual explanation further comprising numerical information.

15. The computing system of claim 1, the explanation engine comprising a natural language generator executed by the processor and being further configured to generate a natural language textual explanation.

16. The computing system of claim 15, the user interface comprising the natural language textual explanation and a numerical tax calculation.

17. The computing system of claim 1, the user interface comprising a hyperlink within the textual explanation, wherein the hyperlink is selectable by the user manipulating an input element of the computing device and through the user interface to present additional information associated with the textual explanation.

18. The computing system of claim 17, the explanation engine being further configured to retrace at least one of the first calculation graph structure and the second calculation graph structure to identify a predecessor or upstream function node and associated function of at least one of the first calculation graph structure and the second calculation graph structure, wherein the additional information is based at least in part upon an additional narrative in the shared data store based at least in part upon a pointer or tag associated with the predecessor or upstream functional node.

19. The computing system of claim 17, wherein the explanation engine is further configured to determine the additional information associated with the textual explanation by retracing at least one of the first calculation graph structure and the second calculation graph structure.

20. The computing system of claim 19, wherein the explanation engine is further configured to execute an upstream or backwards retrace of at least one of the first calculation graph structure and the second calculation graph structure.

21. The computing system of claim 1, wherein different explanations are associated with the same functional node and associated function, and the explanation engine is further configured to select one explanation of the different explanations.

22. The computing system of claim 1, wherein the different explanations are associated with respective different types or editions of the computerized tax return preparation application.

23. The computing system of claim 22, wherein the explanation engine is further configured to unlock more detailed explanations to be included in the user interface in response to an upgrade from a first type or edition of the computerized tax return preparation application to a second type or edition of the computerized tax return preparation application.

24. The computing system of claim 1, the data structure comprising a table including respective rows and respective columns, wherein respective rules are defined by respective rows of the table and respective questions are defined by respective columns of the table.

25. The computing system of claim 24, wherein the interface controller is further configured to receive user input through the user interface and update the first runtime data stored in the shared data store to generate second runtime data stored in the shared data store.

26. The computing system of claim 25, wherein calculation engine is further configured to read the second user-specific data as the input and perform the plurality of tax calculation operations utilizing the tax calculation graph populated the second user-specific data and update the second runtime data stored in the shared data store based at least in part upon the plurality of tax calculation operations to generate third runtime data in the shared data store.

27. The computing system of claim 26, wherein the rule-based logic agent is further configured to read the third runtime data stored in the shared data store, determine which questions of the computerized tax return preparation application remain unanswered based at least in part upon the third runtime data and the data structure.

28. The computing system of claim 1, wherein the rule-based logic agent is further configured to eliminate at least one rule defined by at least one row of the decision table based at least in part upon the first runtime data to reduce a number of candidate questions to include in the non-binding suggestion for the interface controller.

* * * * *